(12) United States Patent
Inoue

(10) Patent No.: US 10,142,048 B2
(45) Date of Patent: Nov. 27, 2018

(54) OPTICAL TRANSMISSION DEVICE, OPTICAL COMMUNICATION DEVICE, OPTICAL COMMUNICATION SYSTEM, AND OPTICAL TRANSMISSION METHOD

(71) Applicant: NEC Corporation, Tokyo (JP)

(72) Inventor: Takanori Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/123,788

(22) PCT Filed: Feb. 27, 2015

(86) PCT No.: PCT/JP2015/001035
§ 371 (c)(1),
(2) Date: Sep. 6, 2016

(87) PCT Pub. No.: WO2015/133106
PCT Pub. Date: Sep. 11, 2015

(65) Prior Publication Data
US 2017/0019205 A1 Jan. 19, 2017

(30) Foreign Application Priority Data
Mar. 7, 2014 (JP) .................................. 2014-044937

(51) Int. Cl.
*H04B 10/50* (2013.01)
*H04J 14/02* (2006.01)
(Continued)

(52) U.S. Cl.
CPC ...... *H04J 14/0272* (2013.01); *H04B 10/2507* (2013.01); *H04B 10/506* (2013.01); *H04B 10/541* (2013.01)

(58) Field of Classification Search
CPC .............. H04B 10/506; H04B 10/2507; H04B 10/541; H04J 14/0272
(Continued)

(56) References Cited

U.S. PATENT DOCUMENTS

| 5,801,863 A | 9/1998 | Fatehi et al. |
| 6,014,248 A * | 1/2000 | Kobayashi ........... H04B 10/296 359/337.13 |

(Continued)

FOREIGN PATENT DOCUMENTS

| CN | 1450732 | 10/2003 |
| JP | 4-98912 | 3/1992 |

(Continued)

OTHER PUBLICATIONS

N. Fontaine et al., "Fiber Nonlinearity Compensation by Digital Backpropagation of an Entire 1.2-Tb/s Superchannel Using a Full-Field Spectrally-Sliced Receiver", 39th European Conference and Exhibition on Optical Communication (ECOC 2013), pp. 1-3, Sep. 2013.

(Continued)

*Primary Examiner* — Ken N Vanderpuye
*Assistant Examiner* — Dibson Sanchez
(74) *Attorney, Agent, or Firm* — Finnegan, Henderson, Farabow, Garrett & Dunner, L.L.P.

(57) ABSTRACT

It is intended to suppress the deterioration of the transmission quality of an optical signal propagating through an optical fiber due to the intensity variation of a control signal. An exemplary aspect of the present invention includes outputting main signal light; generating a first optical signal by intensity-modulating an optical signal depending on a control signal; generating a second optical signal by intensity-modulating an optical signal depending on a differential component between a prescribed signal having a constant (Continued)

intensity and the control signal; outputting a wavelength-multiplexed optical signal by multiplexing the first optical signal being generated and the second optical signal being generated; and transmitting a transmitting signal by multiplexing the output main signal light being output and the wavelength-multiplexed optical signal being output.

11 Claims, 17 Drawing Sheets

(51) Int. Cl.
*H04B 10/2507* (2013.01)
*H04B 10/54* (2013.01)

(58) Field of Classification Search
USPC ................................................ 398/182–201
See application file for complete search history.

(56) References Cited

U.S. PATENT DOCUMENTS

| | | | | |
|---|---|---|---|---|
| 6,661,974 B1* | 12/2003 | Akiyama | ............ | H04B 10/2513 398/158 |
| 6,735,395 B1* | 5/2004 | Bai | ............... | H04B 10/504 398/196 |
| 7,072,592 B2* | 7/2006 | Sarraf | ............... | H04B 10/506 398/192 |
| 7,302,182 B2* | 11/2007 | Carrick | ............... | H04B 10/00 398/32 |
| 8,213,798 B2* | 7/2012 | Ooi | ............... | H04B 10/2557 398/135 |
| 8,670,665 B2* | 3/2014 | Toyomaki | ............... | H04J 14/02 398/32 |
| 9,191,102 B2* | 11/2015 | Joffe | ............... | H04B 10/071 |
| 2002/0015202 A1* | 2/2002 | Michishita | ............... | H04J 14/02 398/79 |
| 2002/0176132 A1* | 11/2002 | Sarraf | ............... | H04B 10/506 398/91 |
| 2003/0025957 A1* | 2/2003 | Jayakumar | ............. | H04B 10/00 398/5 |
| 2003/0165286 A1 | 9/2003 | Ikushima et al. | | |
| 2003/0170028 A1* | 9/2003 | Mori | ............... | H04B 10/2537 398/79 |
| 2004/0081421 A1* | 4/2004 | Mori | ............... | H04B 10/506 385/140 |
| 2006/0140626 A1* | 6/2006 | Robinson | ............ | H04B 10/077 398/30 |
| 2007/0091310 A1* | 4/2007 | Hainberger | ........... | G02F 1/0136 356/364 |
| 2009/0129778 A1* | 5/2009 | Phillips | ............... | H04B 10/2507 398/65 |

FOREIGN PATENT DOCUMENTS

| | | |
|---|---|---|
| JP | 2001-333016 | 11/2001 |
| JP | 2010-178090 | 8/2010 |
| JP | 2011-250079 | 12/2011 |

OTHER PUBLICATIONS

L.B. Du et al., Digital Fiber Nonlinearity Compensation: Toward 1-Tb/s transport, IEEE Signal Processing Magazine, vol. 31, Issue 2, pp. 46-56, Mar. 2014.
International Search Report and Written Opinion dated Mar. 31, 2015, in corresponding PCT International Application.
International Search Report dated Dec. 25, 2017, in corresponding in corresponding Chinese Patent Application No. 201580012541.9.
Extended European Search Report dated Oct. 10, 2017, in counterpart European Patent Application No. 15758101.8.

* cited by examiner

OPTICAL TRANSMISSION DEVICE, OPTICAL COMMUNICATION DEVICE, OPTICAL COMMUNICATION SYSTEM, AND OPTICAL TRANSMISSION METHOD

CROSS-REFERENCE TO RELATED PATENT APPLICATIONS

This application is a National Stage Entry of International Application No. PCT/JP2015/001035, filed Feb. 27, 2015, which claims priority from Japanese Patent Application No. 2014-044937, filed Mar. 7, 2014. The entire contents of the above-referenced applications are expressly incorporated herein by reference.

TECHNICAL FIELD

The present invention relates to an optical transmission device, an optical communication device, an optical communication system, and an optical transmission method.

BACKGROUND ART

In an optical communication system, an optical relay or an optical branching unit may be installed in a readily inaccessible location such as the seabed. Accordingly, it is preferable to control the optical relay or the optical branching unit remotely through transmitting a control signal from an optical terminal equipment or the like.

PTL 1 discloses a technique to transmit an optical signal obtained by superposing a monitoring control signal on a data signal in an optical communication system. In the optical communication system described in PTL 1, an optical signal is generated by superposing the monitoring control signal whose intensity is changed to be "0" or "1" on the data signal, and the generated optical signal is transmitted through an optical transmission line composed of optical fibers.

CITATION LIST

Patent Literature

[PTL 1] JP 2010-178090 A
[PTL 2] JP 2011-250079 A

SUMMARY OF INVENTION

Technical Problem

The optical fiber used for propagating the optical signal has the property that a refractive index thereof varies depending on the intensity of the optical signal (Kerr effect). Consequently, it causes the refractive index of the optical fiber to vary that the intensity of the optical signal propagating through the optical fiber varies, which results in deterioration of transmission quality.

Therefore, in the optical communication system according to PTL 1, if the monitoring control signal whose intensity is changed to be "0" or "1" is superposed on the data signal, the optical signal propagating through the optical fiber have the potential to cause a phase modulation or a polarization modulation because the refractive index of the optical fiber varies due to the intensity variation of the monitoring control signal.

The object of the present invention is to provide an optical transmission device, an optical communication device, an optical communication system, and an optical transmission method that solve the above-described problems and make it possible to suppress the deterioration of the transmission quality of an optical signal propagating through an optical fiber due to the intensity variation of a control signal.

Solution to Problem

In order to achieve the above-described object, an optical transmission device according to an exemplary aspect of the present invention includes transmitting means for outputting main signal light; control signal generating means for outputting a wavelength-multiplexed optical signal including a control signal; and first optical multiplexing means for multiplexing the main signal light and the wavelength-multiplexed optical signal and transmitting a transmitting signal, wherein the control signal generating means includes a first optical modulator configured to intensity-modulate an optical signal depending on the control signal, the first optical modulator configured to output a first optical signal, a second optical modulator configured to intensity-modulate an optical signal depending on a differential component between a prescribed signal having a constant intensity and the control signal, the second optical modulator configured to output a second optical signal, and second optical multiplexing means for outputting the wavelength-multiplexed optical signal in which the first optical signal and the second optical signal being multiplexed.

In order to achieve the above-described object, an optical communication device according to an exemplary aspect of the present invention includes an optical filter configured to receive a transmitting signal in which a first optical signal intensity-modulated depending on a control signal, a second optical signal intensity-modulated depending on a differential component between a prescribed optical signal having a constant intensity and the control signal, and main signal light being multiplexed, the optical filter configured to transmit an optical signal having a wavelength corresponding to the control signal from among the transmitting signal; and control means for obtaining the control signal by decoding the optical signal being transmitted, the control means for performing a control based on the control signal being obtained.

In order to achieve the above-described object, an optical communication system according to an exemplary aspect of the present invention includes the optical transmission device configured to transmit a transmitting signal; and the optical communication device configured to receive the transmitting signal being transmitted.

In order to achieve the above-described object, an optical transmission method according to an exemplary aspect of the present invention includes outputting main signal light; generating a first optical signal by intensity-modulating an optical signal depending on a control signal; generating a second optical signal by intensity-modulating an optical signal depending on a differential component between a prescribed signal having a constant intensity and the control signal; outputting a wavelength-multiplexed optical signal by multiplexing the first optical signal being generated and the second optical signal being generated; and transmitting a transmitting signal by multiplexing the output main signal light being output and the wavelength-multiplexed optical signal being output.

Advantageous Effects of Invention

The present invention makes it possible to suppress the deterioration of the transmission quality of an optical signal propagating through an optical fiber due to the intensity variation of a control signal.

DESCRIPTION OF EMBODIMENTS

Figure 1:
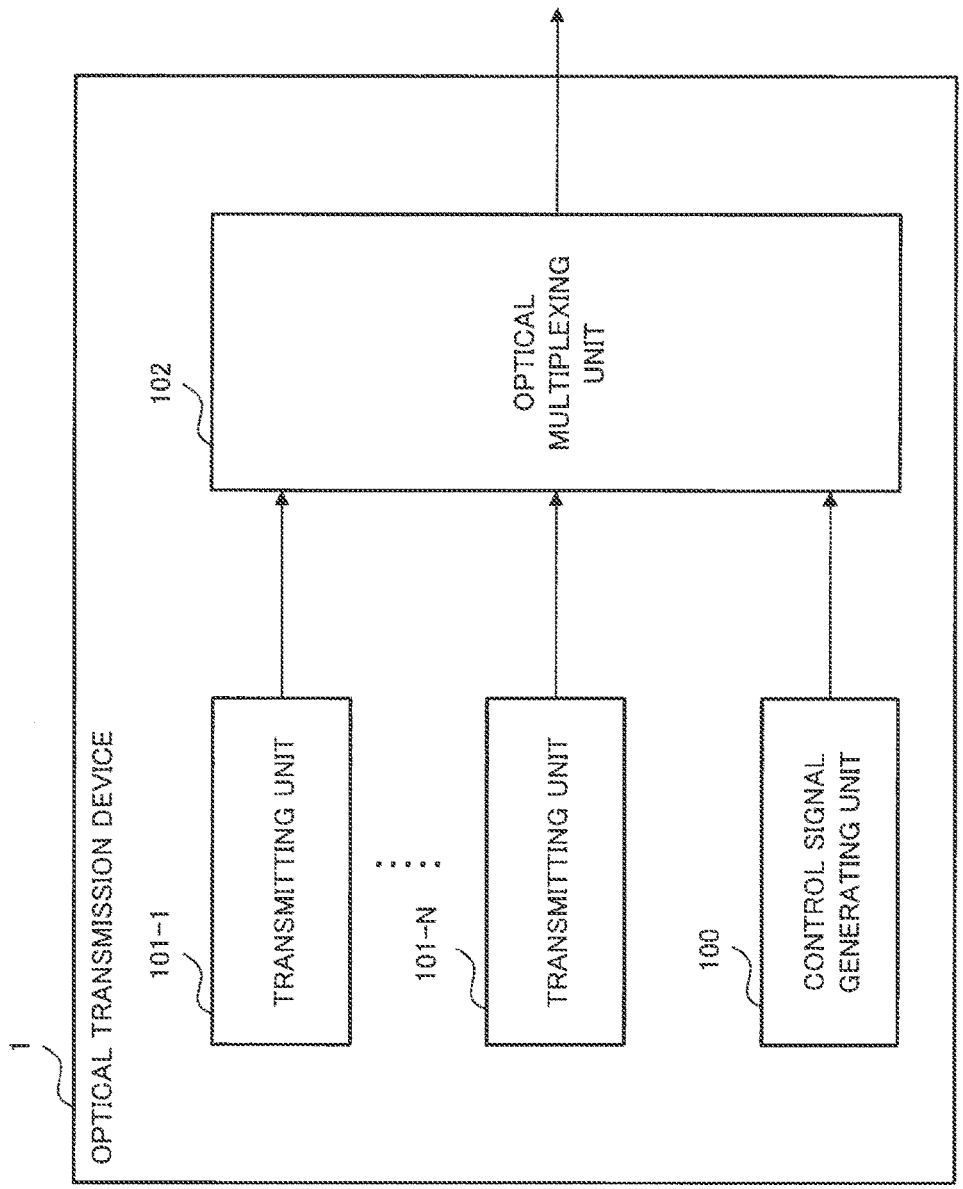
FIG. 1 is a block configuration diagram illustrating an optical transmission device 1 in accordance with a first exemplary embodiment.

Exemplary embodiments of the present invention will be described with reference to the drawings. The reference signs in the drawings are conveniently attached to respective components as examples to bring understanding and do not add any limitations to the contents to be described below.

A First Exemplary Embodiment

A first exemplary embodiment of the present invention will be described. FIG. 1 illustrates a block configuration diagram of an optical transmission device in accordance with the first exemplary embodiment. The optical transmission device 1 includes a plurality of transmitting units 101-1 to 101-N (referred to as "transmitting unit 101" if there is no need to distinguish them particularly), a control signal generating unit 100, and an optical multiplexing unit 102. The optical transmission device 1 transmits a generated optical signal to a transmission line that is not shown.

Each of the plurality of transmitting units 101 transmits main signal light to the optical multiplexing unit 102.

The optical multiplexing unit 102 multiplexes the main signal light inputted from each of the plurality of transmitting units 101 and a wavelength-multiplexed optical signal inputted from the control signal generating unit 100, and transmits a transmitting signal.

The control signal generating unit 100 wavelength-multiplexes an optical signal intensity-modulated depending on a control signal and an optical signal intensity-modulated depending on a differential component between a prescribed optical signal having a constant intensity and the control signal, and transmits a wavelength-multiplexed optical signal to the optical multiplexing unit 102. Since the wavelength-multiplexed optical signal includes the control signal and the differential component between the prescribed optical signal having a constant intensity and the control signal, these signals cancel each other even though the intensity of the control signal varies; and therefore, the light intensity of the wavelength-multiplexed optical signal becomes constant. Hereinafter, the optical signal intensity-modulated depending on the control signal is referred to as a first optical signal, and the optical signal intensity-modulated depending on the differential component between the prescribed optical signal having a constant intensity and the control signal is referred to as a second optical signal.

Figure 2:
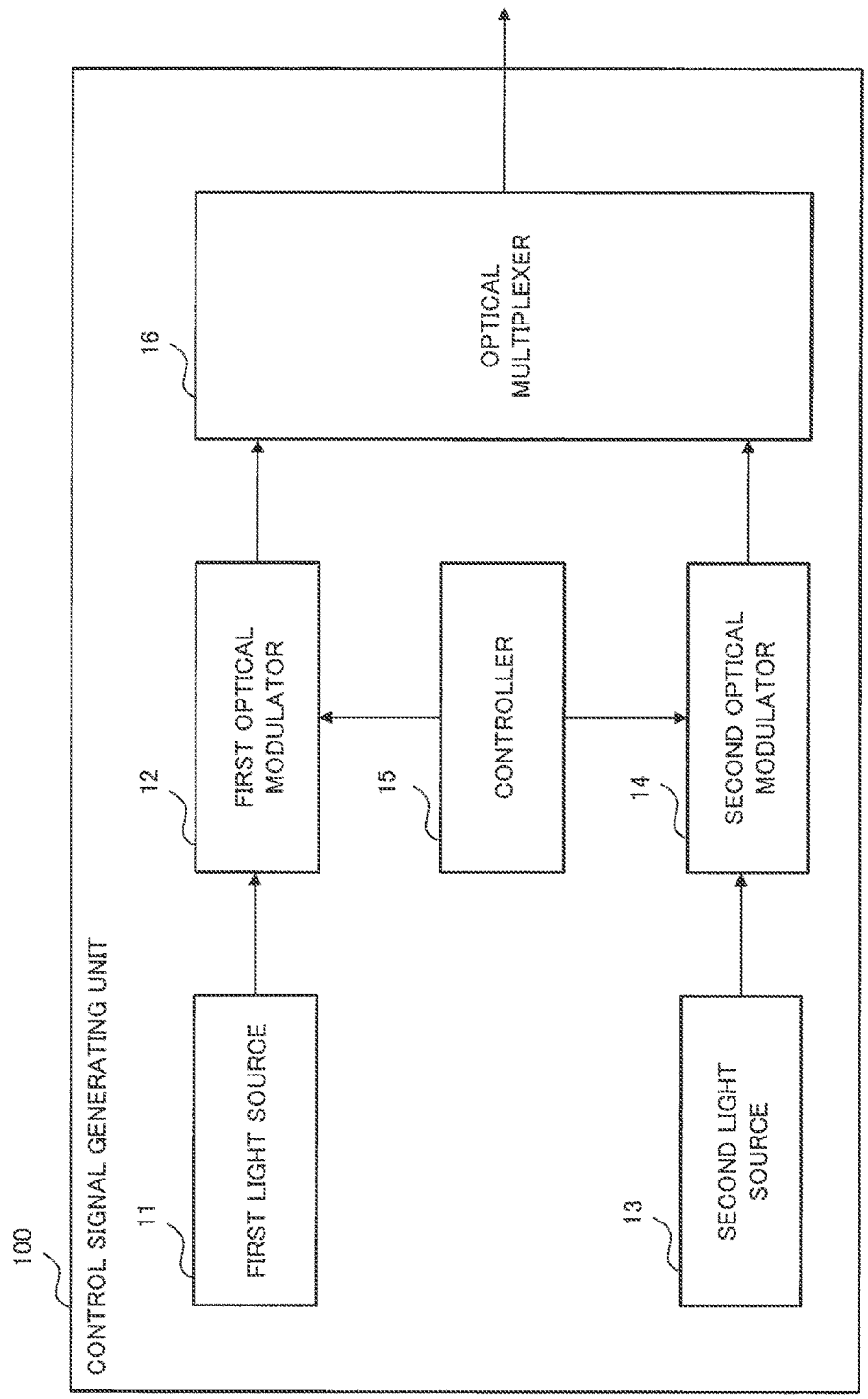
FIG. 2 is a block configuration diagram illustrating a control signal generating unit 100 in accordance with the first exemplary embodiment.

FIG. 2 illustrates a block configuration diagram of the control signal generating unit 100. In FIG. 2, the control signal generating unit 100 includes a first light source 11, a first optical modulator 12, a second light source 13, a second optical modulator 14, a controller 15, and an optical multiplexer 16.

The first light source 11 generates an optical signal having a prescribed wavelength as an optical signal for the control signal. The second light source 13 generates an optical signal whose wavelength is shifted by a prescribed wavelength from the wavelength of the optical signal generated by the first light source 11.

The first optical modulator 12, on demand from the controller 15, performs the intensity modulation depending on the control signal on the optical signal sent from the first light source 11, and outputs the first optical signal to the optical multiplexer 16.

The second optical modulator 14, on demand from the controller 15, performs the intensity modulation depending on the differential component between the prescribed optical signal having a constant intensity and the control signal on the optical signal sent from the second light source 13, and outputs the second optical signal to the optical multiplexer 16. The prescribed optical signal having a constant intensity is an optical signal with the intensity equal to "1", for example. The intensity of the optical signal is not limited to "1".

The controller 15 requires the first optical modulator 12 to perform the intensity modulation depending on the control signal inputted from the outside on the optical signal sent from the first light source 11. On the other hand, the controller 15 requires the second optical modulator 14 to perform the intensity modulation depending on the differential component between the prescribed optical signal having a constant intensity and the above-described control signal on the optical signal sent from the second light source 13.

The optical multiplexer 16 wavelength-multiplexes the first optical signal inputted from the first optical modulator 12 and the second optical signal inputted from the second optical modulator 14, and outputs a wavelength-multiplexed optical signal to the optical multiplexing unit 102.

Figure 3:
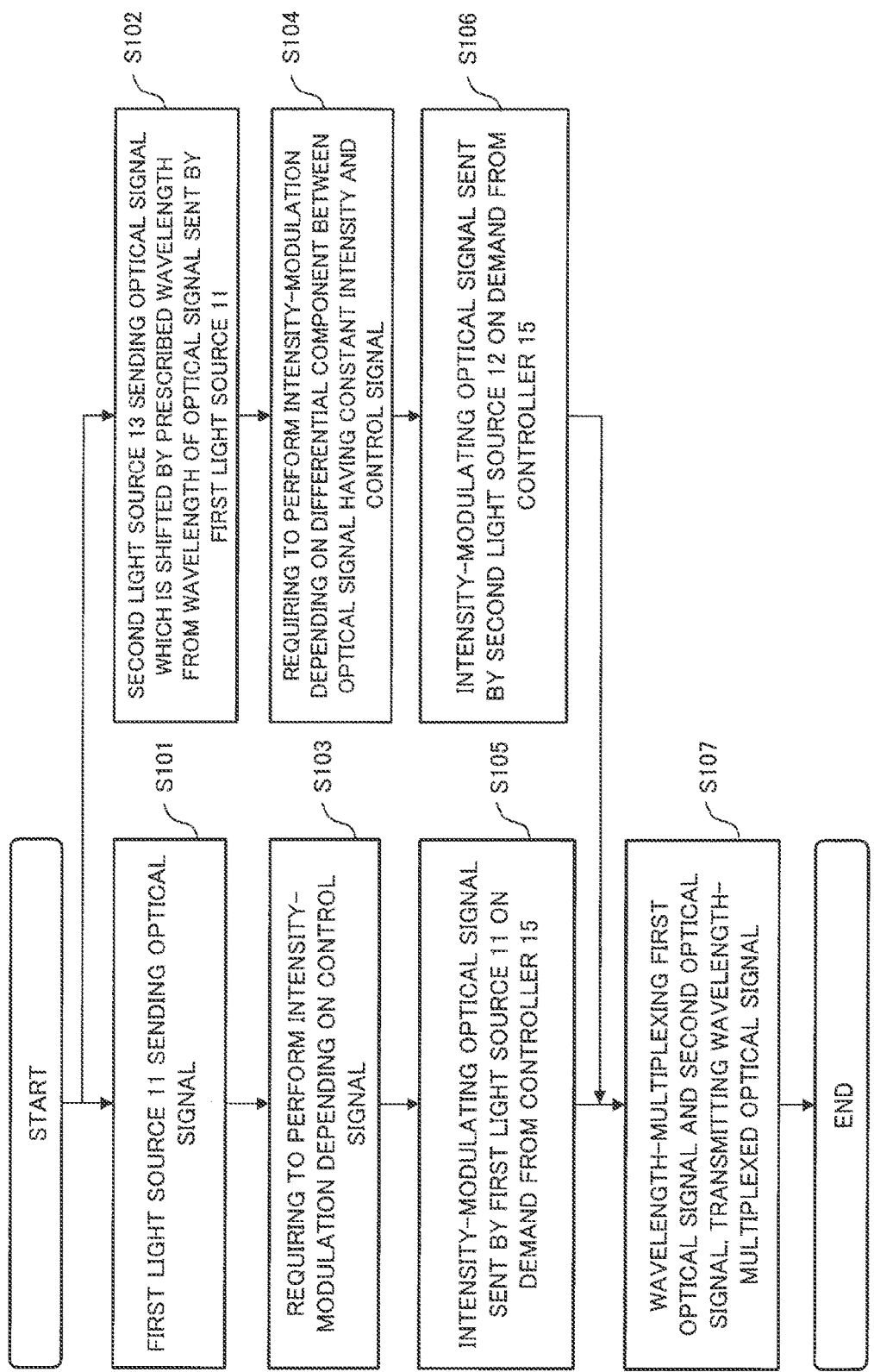
FIG. 3 is a flowchart for the control signal generating unit 100 in accordance with the first exemplary embodiment.

FIG. 3 illustrates a flowchart for the control signal generating unit 100 in the first exemplary embodiment. In FIG. 3, the first light source 11 sends an optical signal having a prescribed wavelength (S101). On the other hand, the second light source 13 sends an optical signal whose wavelength is shifted by a prescribed wavelength from the wavelength of the optical signal sent from the first light source 11 (S102).

The controller 15 requires the first optical modulator 12 to perform the intensity modulation depending on the control signal inputted from the outside on the optical signal sent from the first light source 11 (S103). The controller 15 requires the second optical modulator 14 to perform the intensity modulation depending on the differential component between the prescribed optical signal having a constant intensity and the control signal on the optical signal sent from the second light source 13 (S104).

The first optical modulator 12, on demand from the controller 15, intensity-modulates the optical signal sent from the first light source 11, and outputs the first optical signal (S105). On the other hand, the second optical modulator 14, on demand from the controller 15, intensity-modulates the optical signal sent from the second light source 13, and outputs the second optical signal (S106).

The optical multiplexer 16 wavelength-multiplexes the first optical signal inputted from the first optical modulator 12 and the second optical signal inputted from the second optical modulator 14, and transmits the wavelength-multiplexed optical signal to the optical multiplexing unit 102 (S107).

As described above, the control signal generating unit 100 wavelength-multiplexes the first optical signal intensity-modulated depending on the control signal and the second optical signal intensity-modulated depending on the differential component between the prescribed optical signal having a constant intensity and the control signal, and transmits the wavelength-multiplexed optical signal. Since the wavelength-multiplexed optical signal includes the control signal and the differential component between the prescribed optical signal having a constant intensity and the control signal, these signals cancel each other even though the intensity of the control signal varies; and therefore, the light intensity of the wavelength-multiplexed optical signal becomes constant. Consequently, the intensity variation of the control signal in the optical multiplexing unit 102 does not affect the transmitting signal obtained by multiplexing the main signal light inputted from each of the plurality of transmitting units 101 and the wavelength-multiplexed optical signal inputted from the control signal generating unit 100. Therefore, in the optical transmission device 1 in accordance with the first exemplary embodiment, it is suppressed for the transmission quality of the transmitting signal to deteriorate due to the intensity variation of the control signal.

A Second Exemplary Embodiment

Figure 4:
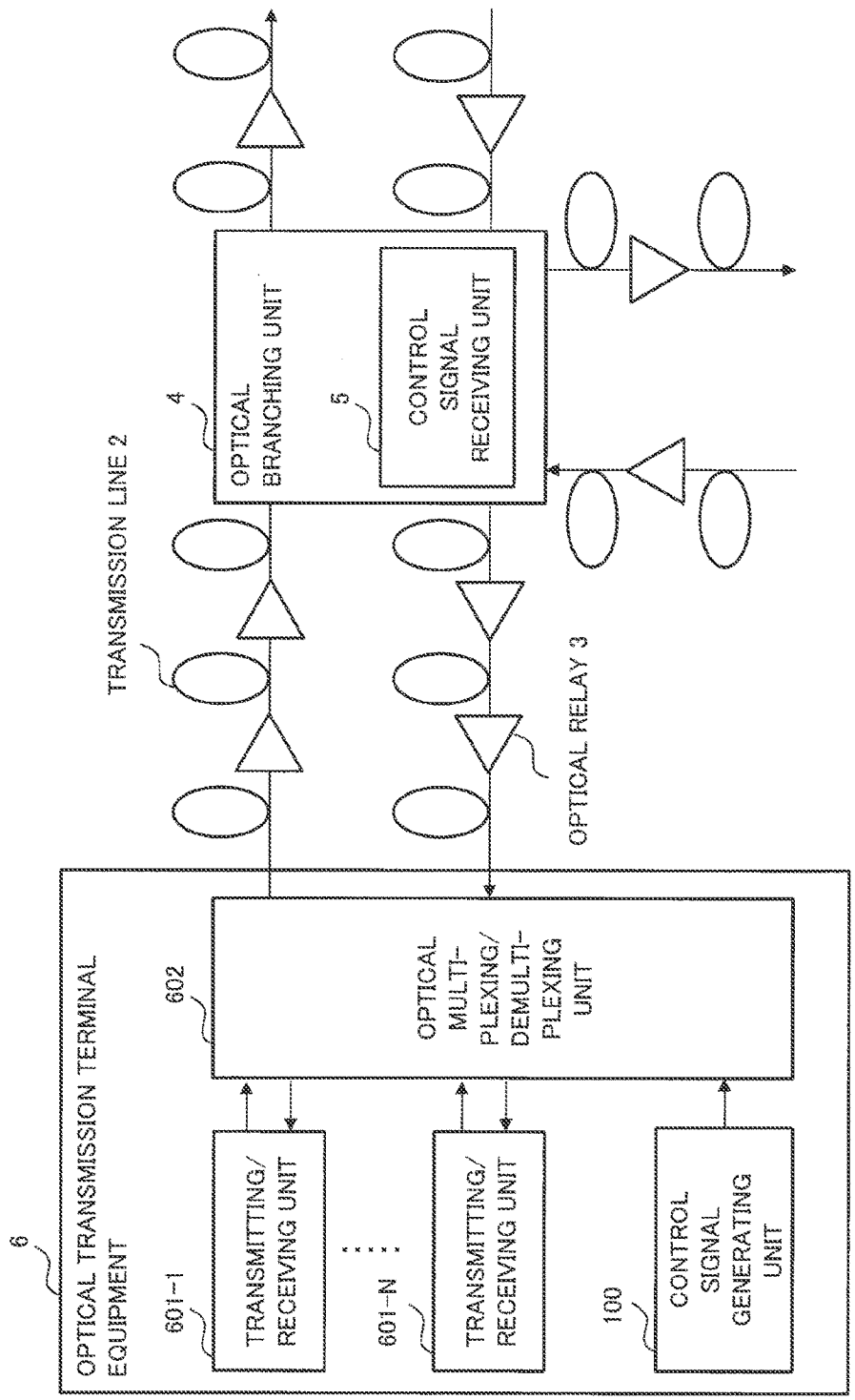
FIG. 4 is a system configuration diagram illustrating a communication system in accordance with a second exemplary embodiment.

A second exemplary embodiment will be described. FIG. 4 illustrates a system configuration diagram of a communication system in accordance with the second exemplary embodiment. As illustrated in FIG. 4, the communication system includes an optical transmission terminal equipment 6, a transmission line 2, an optical relay 3, and an optical branching unit 4.

The transmission line 2 is composed of an optical fiber or the like. The transmission line 2 may be composed of a bundle of the optical fibers, for example.

The optical relay 3 compensates for the intensity of the transmitting signal propagating through the transmission line 2.

The optical branching unit 4 inserts another optical signal into the transmitting signal propagating through the transmission line 2 or branches a part of the transmitting signal. An OADM-BU (Optical Add-Drop Multiplexer-Branching Unit) can be applied to the optical branching unit 4, for example. The OADM-BU adds or drops an optical signal by the wavelength.

The optical branching unit 4 is remotely controlled by the optical transmission terminal equipment 6 by receiving a control signal from the optical transmission terminal equipment 6. The optical branching unit 4 includes a control signal receiving unit 5. The control signal receiving unit 5 decodes a control signal included in the transmitting signal transmitted from the optical transmission terminal equipment 6 and controls devices (such as an optical switch, an optical relay, for example) in the optical branching unit 4.

The optical transmission terminal equipment 6 corresponds to the optical transmission device 1 in FIG. 1 described in the first exemplary embodiment. The optical transmission terminal equipment 6 includes a plurality of transmitting and receiving units 601-1 to 601-N (referred to as "transmitting and receiving unit 601" if there is no need to distinguish them particularly), a control signal generating unit 100, and an optical multiplexing and demultiplexing unit 602.

Each of the transmitting and receiving units 601 transmits main signal light to the optical multiplexing and demultiplexing unit 602. Each of the transmitting and receiving units 601 receives main signal light inputted into the optical transmission terminal equipment 6 from the outside through the optical multiplexing and demultiplexing unit 602.

The optical multiplexing and demultiplexing unit 602 multiplexes the main signal light inputted from each of the plurality of transmitting and receiving units 601 and a wavelength-multiplexed optical signal inputted from the control signal generating unit 100, and transmits a transmitting signal to the transmission line 2. The optical multiplexing and demultiplexing unit 602 extracts the main signal light from a received signal inputted into the optical transmission terminal equipment 6 from the outside through the transmission line 2, and outputs the main signal light to a corresponding transmitting and receiving unit 601.

The control signal generating unit 100 is similar in configuration to the control signal generating unit 100 in FIG. 2 in accordance with the first exemplary embodiment. The control signal generating unit 100 wavelength-multiplexes an optical signal intensity-modulated depending on a control signal to control the optical branching unit 4 inputted from the outside and an optical signal intensity-modulated depending on a differential component between a prescribed optical signal having a constant intensity and the control signal, and transmits a wavelength-multiplexed optical signal to the optical multiplexing and demultiplexing unit 602. In the second exemplary embodiment, the control signal corresponds to a bit sequence of a control command.

Figure 5:
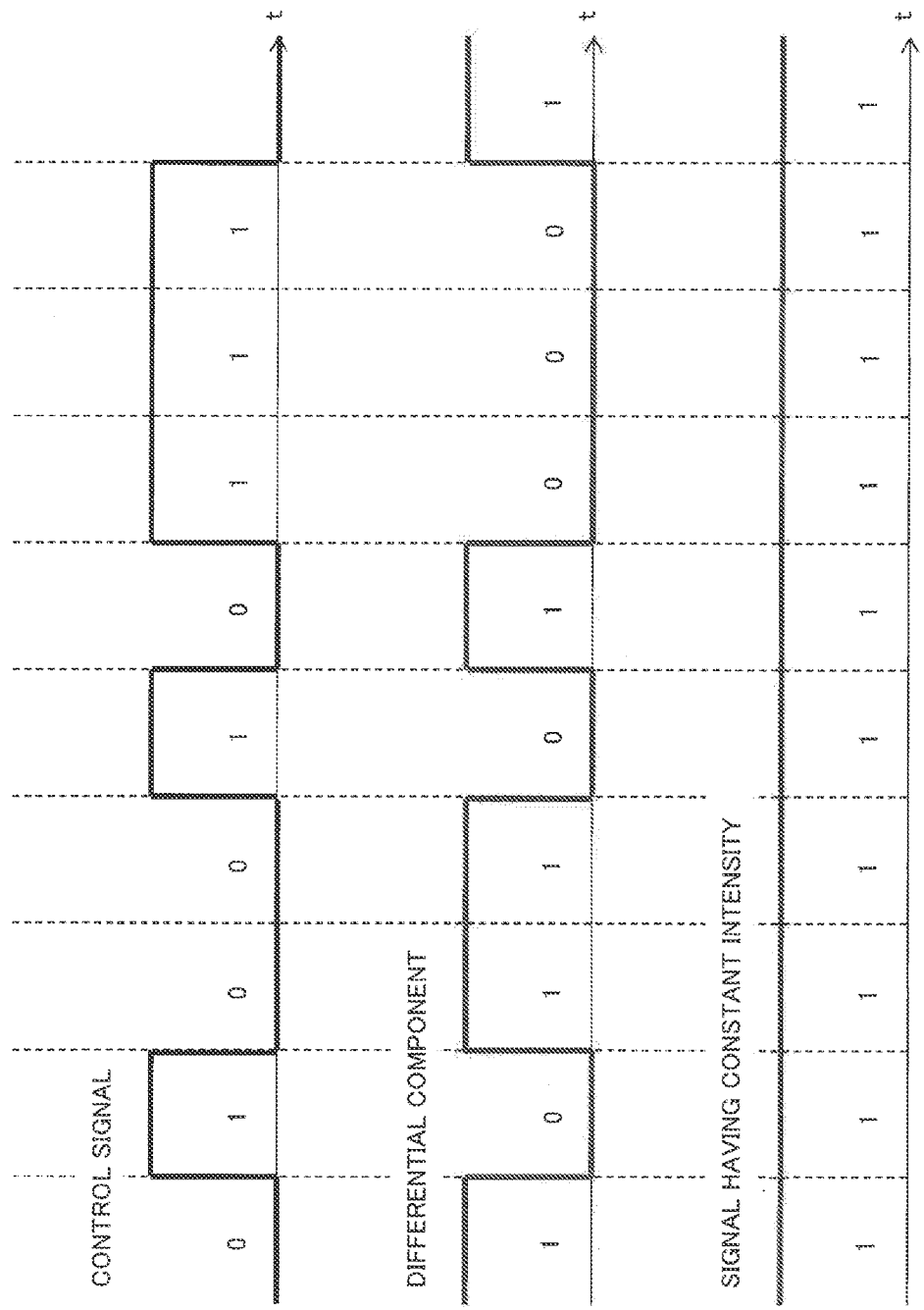
FIG. 5 is a diagram illustrating a relationship between a control signal, a differential component, and a prescribed signal in accordance with the second exemplary embodiment.

FIG. 5 illustrates a relationship between the control signal inputted from the outside, the prescribed optical signal having a constant intensity, and the differential component between the both signals. The control signal is a bit sequence indicating the control command to control the optical branching unit 4 or the like, and is represented by "0" or "1". The prescribed optical signal having a constant intensity is an optical signal whose intensity is always equal to "1", for example. The differential component is a differential bit sequence between the control signal and the optical signal having a constant intensity. Accordingly, as illustrated in FIG. 5, the sum of the control signal and the differential component is always equal to "1" of a constant intensity.

In the control signal generating unit 100 of the optical transmission terminal equipment 6, the controller 15 requires the first optical modulator 12 to perform the intensity modulation according to the control signal illustrated in FIG. 5 on the optical signal sent from the first light source 11. On the other hand, the controller 15 requires the second optical modulator 14 to perform the intensity modulation according to the differential component illustrated in FIG. 5 on the optical signal sent from the second light source 13.

The first optical modulator 12 performs the intensity modulation according to the control signal illustrated in FIG. 5 on the optical signal sent from the first light source 11 on demand from the controller 15, and outputs the first optical signal. The second optical modulator 14 performs the intensity modulation according to the differential component illustrated in FIG. 5 on the optical signal sent from the second light source 13 on demand from the controller 15, and outputs the second optical signal.

The optical multiplexer 16 wavelength-multiplexes the first optical signal inputted from the first optical modulator 12 and the second optical signal inputted from the second optical modulator 14, and transmits the wavelength-multiplexed optical signal. Since the wavelength-multiplexed optical signal includes the control command bit sequence and the differential bit sequence, these signals cancel each other even though the intensity of the control signal varies; and therefore, the intensity of the wavelength-multiplexed optical signal becomes constant (equal to "1" in the example of FIG. 5).

Figure 6:
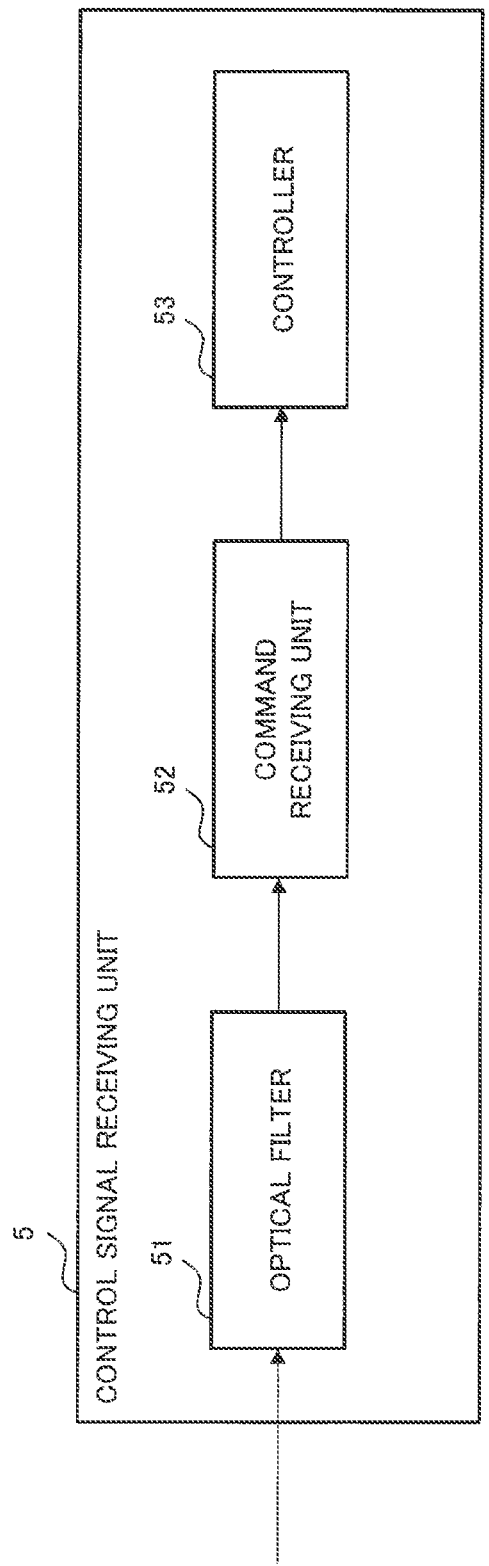
FIG. 6 is a block configuration diagram illustrating a control signal receiving unit 5 in accordance with the second exemplary embodiment.

The optical branching unit 4 will be described in detail. As illustrated in FIG. 4, the optical branching unit 4 includes the control signal receiving unit 5. FIG. 6 illustrates a block configuration diagram of the control signal receiving unit 5. The control signal receiving unit 5 includes an optical filter 51, a command receiving unit 52, and a controller 53.

The optical filter 51 receives the transmitting signal transmitted from the optical transmission terminal equipment 6 through the transmission line 2, and transmits the optical signal having a wavelength component corresponding to the control signal from among the received transmitting signal. That is to say, the optical filter 51 transmits the optical signal whose wavelength is the same as that of the optical signal generated in the first light source 11 of the optical transmission terminal equipment 6.

The command receiving unit 52 decodes the optical signal having the wavelength component corresponding to the control signal transmitted through the optical filter 51, and outputs the control command to the controller 53. The controller 53 controls devices in the optical branching unit 4 according to the control command inputted from the command receiving unit 52.

Figure 7:
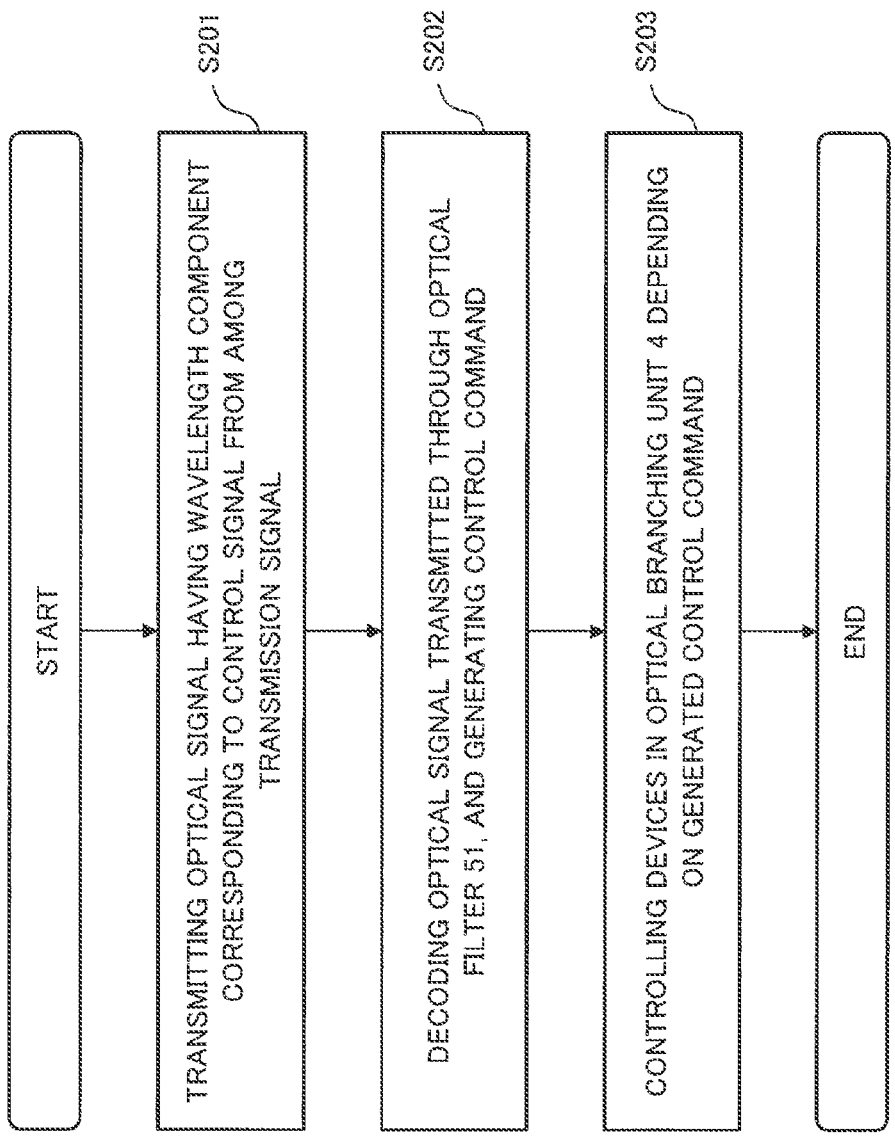
FIG. 7 is a flowchart for the control signal receiving unit 5 in accordance with the second exemplary embodiment.

FIG. 7 illustrates a flowchart for the control signal receiving unit 5 in the second exemplary embodiment. In FIG. 7, the optical filter 51 transmits the optical signal having a wavelength component corresponding to the control signal from among the received transmitting signal (S201). The command receiving unit 52 decodes the optical signal transmitted through the optical filter 51, and generates the control command (S202). The controller 53 controls devices in the optical branching unit 4 according to the control command inputted from the command receiving unit 52 (S203).

As described above, since the sum of the intensity of the control command sequence and the intensity of the differential bit sequence thereof always becomes a constant intensity of "1", the intensity variation of the control signal does not affect the transmitting signal transmitted from the optical transmission terminal equipment 6. This enables to suppress it that the transmission quality of the transmitting signal propagating through the transmission line 2 deteriorates due to the intensity variation of the control signal.

With respect to the optical branching unit 4 in accordance with the second exemplary embodiment, the control signal receiving unit 5 is configured to transmit the optical signal having the same wavelength as that of the optical signal generated in the first light source 11 of the optical transmission terminal equipment 6, but the configuration is not limited to it. Since the differential command sequence is obtained by inverting the control command sequence, it is also possible to transmit the optical signal having the same wavelength as that of the optical signal generated in the second light source 13 of the optical transmission terminal equipment 6, and to control the devices in the optical branching unit 4 using the control command sequence generated from the optical signal. In the second exemplary embodiment, the control signal receiving unit 5 is disposed in the optical branching unit 4, but the configuration is not limited to it. For example, if the optical relay 3 is controlled by the control signal, the control signal receiving unit 5 is disposed also in the optical relay 3.

A Third Exemplary Embodiment

A third exemplary embodiment will be described. A control signal generating unit 100B in an optical transmission device 1 in accordance with the third exemplary embodiment adjusts phases and amplitudes of a first optical signal intensity-modulated according to a control signal and a second optical signal intensity-modulated according to a differential component between a prescribed optical signal having a constant intensity and the control signal.

Figure 8:
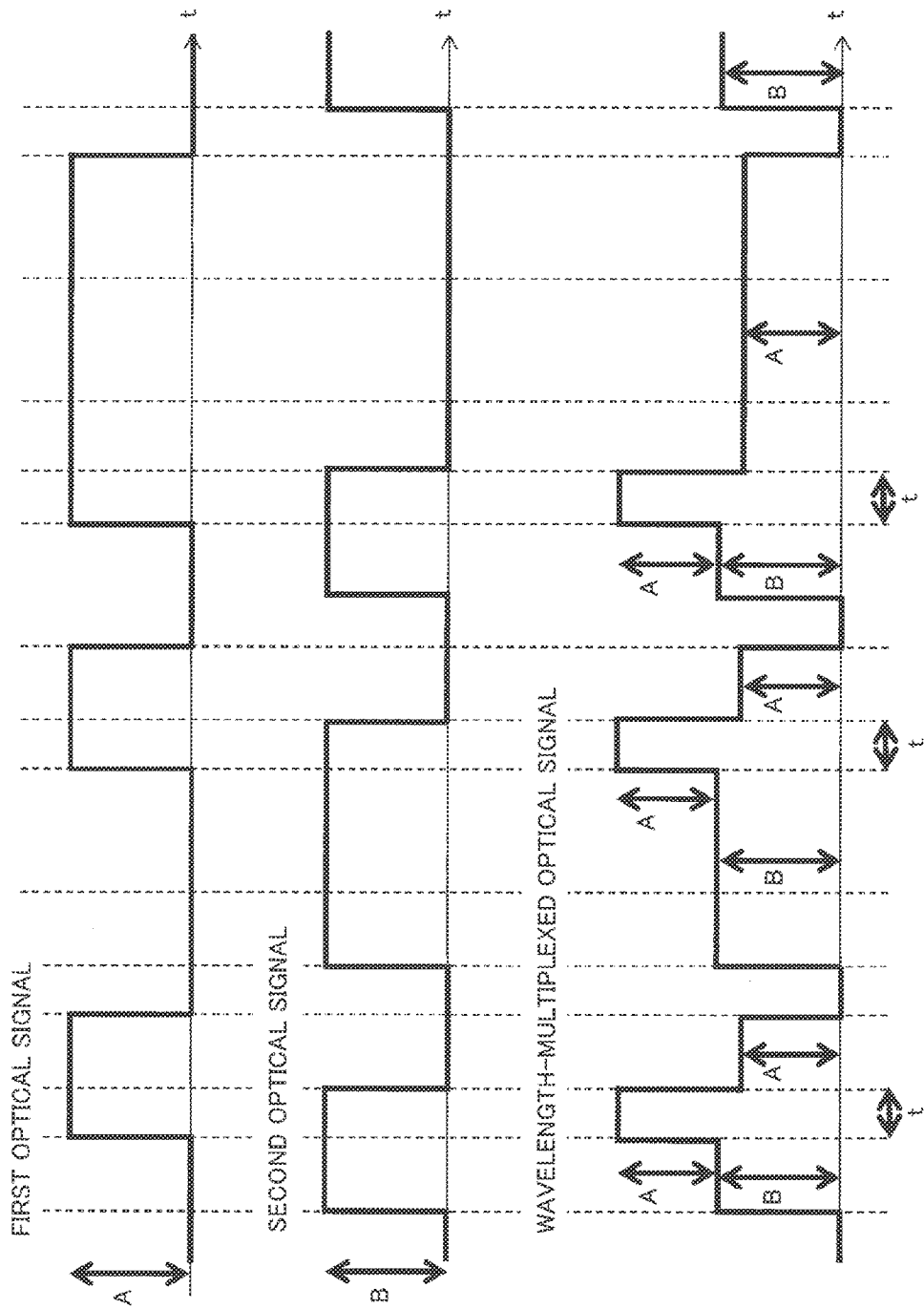
FIG. 8 is a diagram illustrating a relationship between a first optical signal, a second optical signal, and a wavelength-multiplexed optical signal obtained by wavelength-multiplexing the both optical signals in accordance with the second exemplary embodiment.

FIG. 8 is a diagram illustrating a relationship between the first optical signal, the second optical signal, and a wavelength-multiplexed optical signal obtained by wavelength-multiplexing the both optical signals when a delay occurs in the timing of wavelength-multiplexing the first optical signal and the second optical signal. In the example illustrated in FIG. 8, there is a difference also between the light intensity (amplitude A) of the first optical signal and the light intensity (amplitude B) of the second optical signal.

As illustrated in FIG. 8, if a delay occurs in the timing of wavelength-multiplexing the first optical signal and the second optical signal, the intensity of the wavelength-multiplexed optical signal varies significantly. In this case, the transmitting signal obtained by multiplexing the main signal light and the wavelength-multiplexed optical signal causes a phase modulation or a polarization modulation; and therefore, the transmission quality deteriorates. So, in the third exemplary embodiment, the control signal generating unit 100B suppresses the occurrence of delay between the first optical signal and the second optical signal.

If a difference occurs between the light intensity of the first optical signal (amplitude A) and the light intensity of the second optical signal (amplitude B), the intensity variation of the wavelength-multiplexed optical signal obtained by wavelength-multiplexing the both signals increases further. When the light intensity of the first optical signal and the second optical signal of its differential component stays constant, the intensity of the wavelength-multiplexed optical signal also becomes constant; however, if the light intensity of one optical signal varies, the light intensity of the wavelength-multiplexed optical signal also varies with that. So, in the third exemplary embodiment, it is suppressed that the intensity of the wavelength-multiplexed optical signal varies by making the light intensity of one optical signal fit in with the light intensity of the other optical signal.

Figure 9:
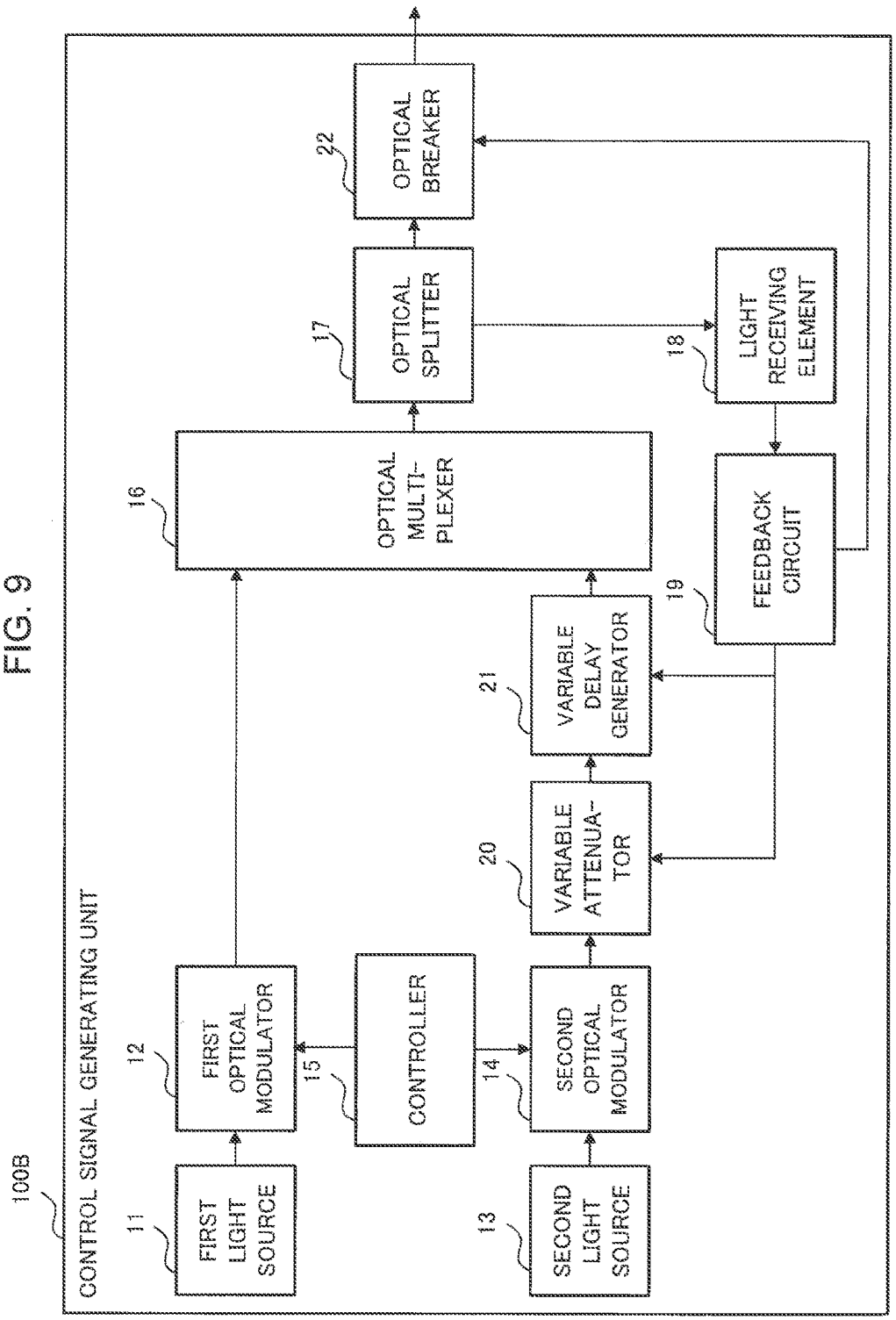
FIG. 9 is a block configuration diagram illustrating a control signal generating unit 100B in accordance with a third exemplary embodiment.

FIG. 9 illustrates a block configuration diagram of the control signal generating unit 100B in the third exemplary embodiment. In FIG. 9, the control signal generating unit 100B is configured by adding an optical splitter 17, a light receiving element 18, a feedback circuit 19, a variable attenuator 20, a variable delay generator 21, and an optical breaker 22 to the control signal generating unit 100 in FIG. 2 described in the first exemplary embodiment.

The optical splitter 17 splits the wavelength-multiplexed optical signal inputted from the optical multiplexer 16 and outputs one to the light receiving element 18 and the other to the optical breaker 22.

The light receiving element 18 converts the inputted one of the wavelength-multiplexed optical signal into an electric signal and outputs the electric signal to the feedback circuit 19.

The feedback circuit 19 detects a phase shift (phase difference) and an amplitude shift (amplitude difference) between the first optical signal and the second optical signal from the inputted electric signal. The feedback circuit 19 makes the optical breaker 22 stop outputting the wavelength-multiplexed optical signal if the detected shift is larger than a prescribed threshold value, and makes the optical breaker 22 resume outputting the wavelength-multiplexed optical signal if the detected shift becomes smaller than the prescribed threshold value.

In FIG. 8, the first optical signal and the second optical signal in the wavelength-multiplexed optical signal are enhanced only for a time "t" corresponding to the phase shift between the first optical signal and the second optical signal; and thus, the amplitude becomes "A+B". And so, the feedback circuit 19 detects the time "t" for the peak "A+B" of the amplitude of the wavelength-multiplexed optical signal, and regards the time as the phase shift between the first optical signal and the second optical signal.

In FIG. 8, the amplitude of the wavelength-multiplexed optical signal is equal to any one of "0", "A", "B", and "A+B". The feedback circuit 19 detects these amplitudes of the wavelength-multiplexed optical signal and regards "B−A" as the amplitude shift.

The feedback circuit 19 adjusts the phase of the second optical signal using the variable delay generator 21 so as to eliminate the phase difference between the first optical signal and the second optical signal based on the detected phase shift. The feedback circuit 19 varies the phase of the second optical signal in a prescribed direction, for example. If this enlarges the phase difference, the feedback circuit 19 compensates for the phase difference in a direction opposite to the prescribed direction in compensating for the phase difference next time.

The feedback circuit 19 adjusts the amplitude of the second optical signal using the variable attenuator 20 so as to eliminate the amplitude difference between the first optical signal and the second optical signal based on the detected amplitude shift. The feedback circuit 19 compensates for the amplitude so as to reduce the amplitude of the second optical signal, for example. If this enlarges the amplitude difference, the feedback circuit 19 compensates for the amplitude so as to enlarge the amplitude of the second signal in compensating for the amplitude shift next time.

The variable delay generator 21 varies the phase of the second optical signal on demand from the feedback circuit 19. The variable delay generator 21 accelerates the phase of the second optical signal by a prescribed quantity of phase (or delays), for example.

The variable attenuator 20 varies the amplitude of the second optical signal on demand from the feedback circuit 19. The variable attenuator 20 attenuates the amplitude of the second optical signal by a prescribed quantity of amplitude, for example.

The optical breaker 22 blocks or resumes the outputting of the wavelength-multiplexed optical signal based on instructions from the feedback circuit 19. If the wavelength-multiplexed optical signal is output before the adjustment in the feedback circuit 19 is done, the intensity of the wavelength-multiplexed optical signal varies; and thus, the transmitting signal obtained by combining the wavelength-multiplexed optical signals causes a phase modulation or a polarization modulation while propagating through the transmission line 2, so that the transmission quality deteriorates. Accordingly, the optical breaker 22 blocks the wavelength-multiplexed optical signal so that the wavelength-multiplexed optical signal output from the optical multiplexer 16 may not be inputted into the optical multiplexing unit 102 while the phase shift and the amplitude shift larger than a prescribed threshold value are being detected.

As described above, the control signal generating unit 100B in the optical transmission device 1 in accordance with the third exemplary embodiment includes the feedback circuit 19, the variable delay generator 21, and the variable attenuator 20, and it is possible to make the phase and the amplitude of the second optical signal fit in with the phase and the amplitude of the first optical signal. This makes it possible to suppress the intensity variation of the wavelength-multiplexed optical signal obtained by wavelength-multiplexing the first optical signal and the second optical signal. Therefore, the optical transmission device 1 in accordance with the third exemplary embodiment can reduce the impact of the intensity variation in the control signal in the transmitting signal propagating through the transmission line 2 and suppress the deterioration of the transmission quality of the transmitting signal.

Figure 10:
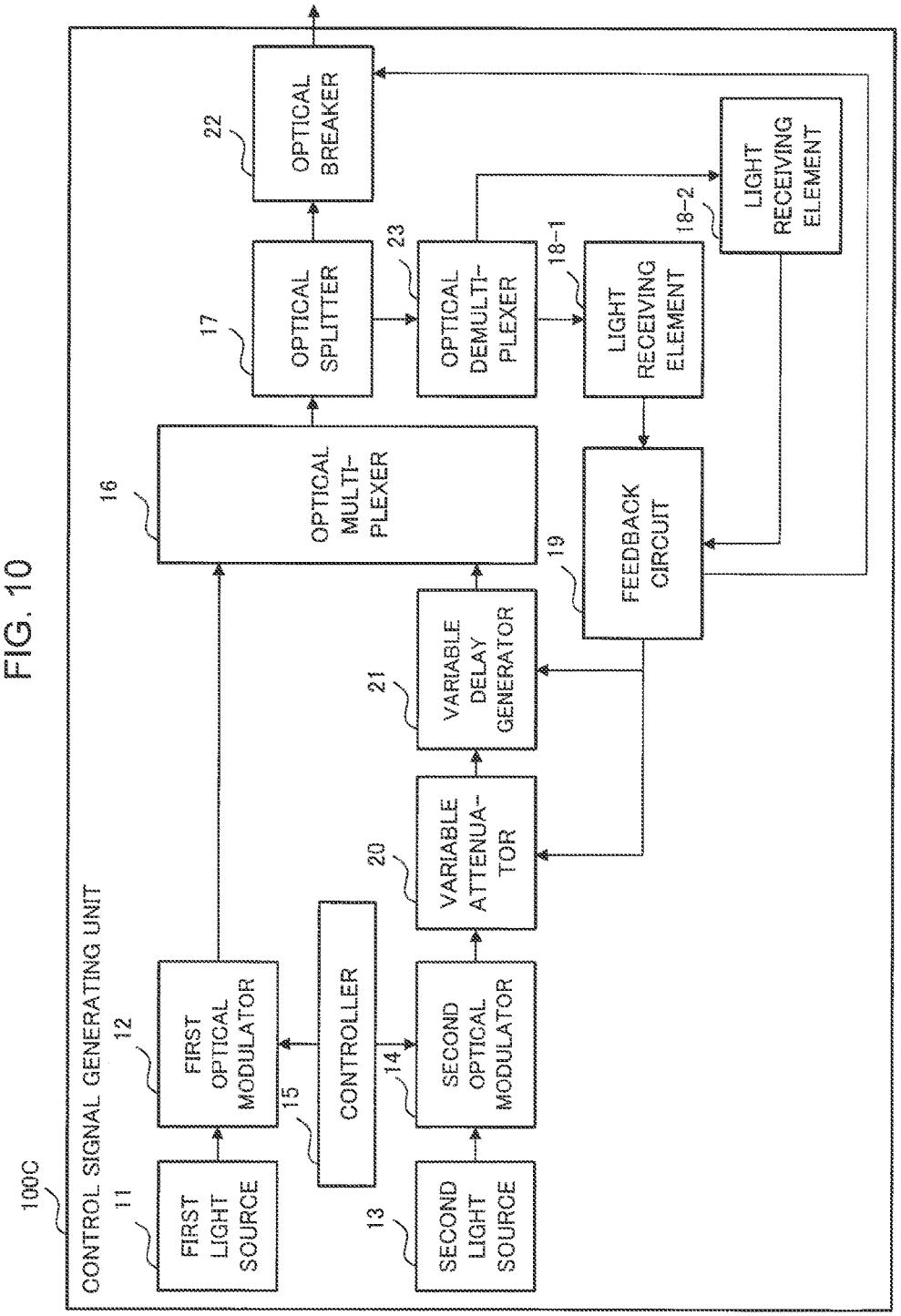
FIG. 10 is a block configuration diagram illustrating another control signal generating unit 100C in accordance with the third exemplary embodiment.

As illustrated in FIG. 10, it is also possible to dispose two light receiving elements 18-1 and 18-2, an optical splitter 17, and an optical demultiplexer 23 in a control signal generating unit 100C, and to compare directly the phase and the amplitude of the first optical signal with the phase and the amplitude of the second optical signal.

The optical demultiplexer 23 demultiplexes the wavelength-multiplexed optical signal split by the optical splitter 17 into a first optical signal and a second optical signal, and outputs the first optical signal to the light receiving element 18-1 and outputs the second optical signal to the light receiving element 18-2, for example.

The light receiving element 18-1 converts the first optical signal inputted from the optical demultiplexer 23 into an electric signal and outputs the electric signal to the feedback circuit 19. The light receiving element 18-2 converts the second optical signal inputted from the optical demultiplexer 23 into an electric signal and outputs the electric signal to the feedback circuit 19.

The feedback circuit 19 compares the electric signals inputted from each of the light receiving element 18-1 and the light receiving element 18-2, and detects a phase shift and an amplitude shift between the both electric signals. The feedback circuit 19 controls the phase of the second optical signal so as to eliminate the phase shift between the first optical signal and the second optical signal for the variable delay generator 21 based on the detected phase shift. The feedback circuit 19 controls the amplitude of the second optical signal so as to eliminate the amplitude shift between the first optical signal and the second optical signal for the variable attenuator 20 based on the detected amplitude shift.

The optical transmission device 1 including the control signal generating unit 100C illustrated in FIG. 10 can also reduce the impact of the intensity variation in the control signal in the transmitting signal propagating through the transmission line 2 and suppress the deterioration of the transmission quality of the transmitting signal.

A Fourth Exemplary Embodiment

A fourth exemplary embodiment will be described. In an optical transmission device 1 in accordance with the fourth exemplary embodiment, a control signal generating unit 100D reduces a shift between the polarization of a first optical signal intensity-modulated according to a control signal and the polarization of a second optical signal intensity-modulated according to a differential component between a prescribed optical signal having a constant intensity and the control signal.

If there is a shift between the polarization of the first optical signal and the polarization of the second optical signal, the intensities of the two optical signals vary separately due to a PDL (polarization dependent loss) of an optical fiber composing a transmission line 2 or to a PDG (polarization dependent gain) of an optical relay 3. If the intensity of the first optical signal and the intensity of the second optical signal vary separately, the control signal and the differential component superposed on the both signals do not cancel each other, and the intensity of a wavelength-multiplexed optical signal obtained by wavelength-multiplexing the both signals varies. In this case, the transmitting signal obtained by multiplexing main signal light and the wavelength-multiplexed optical signal causes a phase modulation or a polarization modulation, and the transmission quality deteriorates.

Figure 11:
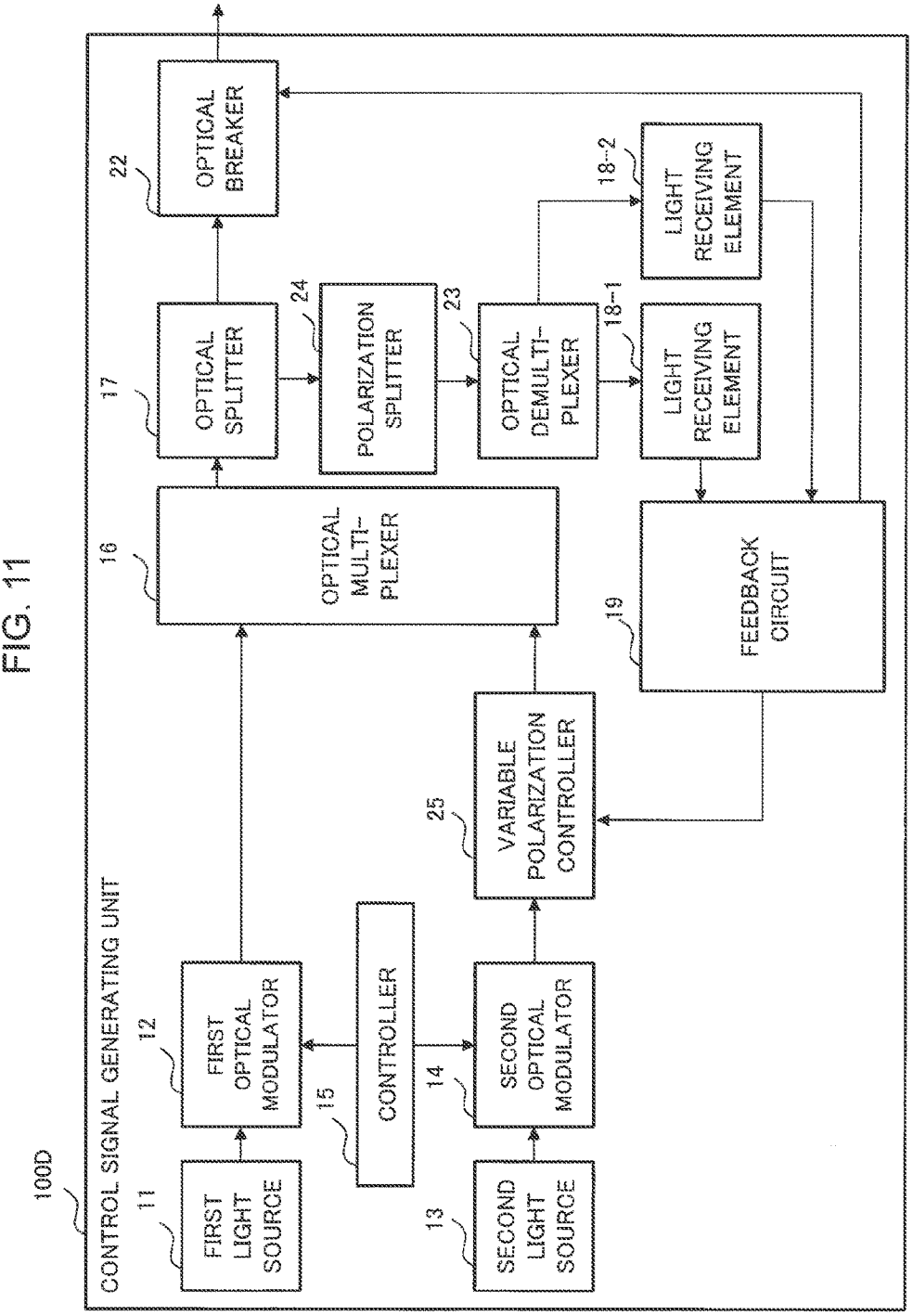
FIG. 11 is a block configuration diagram illustrating a control signal generating unit 100D in accordance with a fourth exemplary embodiment.

FIG. 11 illustrates a block configuration diagram of the control signal generating unit 100D in accordance with the fourth exemplary embodiment. As illustrated in FIG. 11, the control signal generating unit 100D is configured by adding an optical splitter 17, an optical demultiplexer 23, a polarization splitter 24, light receiving elements 18-1 and 18-2, a feedback circuit 19, a variable polarization controller 25, and an optical breaker 22 to the control signal generating unit 100 in FIG. 2 described in the first exemplary embodiment.

The optical splitter 17 splits the wavelength-multiplexed optical signal inputted from the optical multiplexer 16 and outputs one to the polarization splitter 24 and the other to the optical breaker 22.

The polarization splitter 24 outputs to the optical demultiplexer 23 a vertical component of the polarization of the inputted one of the wavelength-multiplexed optical signal. The component of the polarization of the optical signal output by the polarization splitter 24 may be a horizontal component.

The optical demultiplexer 23 demultiplexes the inputted vertical component of the polarization into a vertical component of the polarization of the first optical signal and a vertical component of the polarization of the second optical signal, and outputs the vertical component of the polarization of the first optical signal to the light receiving element 18-1 and outputs the vertical component of the polarization of the second optical signal to the light receiving element 18-2.

The light receiving element 18-1 outputs to the feedback circuit 19 the optical power of the inputted vertical component of the polarization of the first optical signal. On the other hand, the light receiving element 18-2 outputs to the feedback circuit 19 the optical power of the inputted vertical component of the polarization of the second optical signal.

The feedback circuit 19 compares the optical power of the vertical component of the polarization of the first optical signal inputted from the light receiving element 18-1 with the optical power of the vertical component of the polarization of the second optical signal inputted from the light receiving element 18-2, and detects a shift between the both components.

If the polarization of the first optical signal is the same as the polarization of the second optical signal, the shift between the both polarizations should not be detected. And so, when a shift occurs between the polarization of the first optical signal and the polarization of the second optical signal, the feedback circuit 19 varies the polarization of the second optical signal using the variable polarization controller 25 so as to eliminate the detected shift between the polarizations. That is to say, the feedback circuit 19 makes the both polarizations the same by fitting the polarization of the second optical signal to the polarization of the first optical signal.

The variable polarization controller 25 varies the polarization of the second optical signal on demand from the feedback circuit 19. As the variable polarization controller 25, for example, a polarization controller described in JP 3936226 B2 can be used, and the variable polarization controller 25 makes the polarization state of the second optical signal follow every variation of the polarization continuously without saturation.

The polarization controller described in JP 3936226 B2 includes at least five variable phase elements, and each of the five variable phase elements performs polarization conversion on the incident light (corresponding to the second optical signal in the present exemplary embodiment) and converts the polarization state of the incident light into a desired polarization state. The variable phase element is a variable linear phase element configured by combining a variable Faraday rotator and a quarter wavelength plate.

The variable Faraday rotator is a so-called variable circular phase element which rotates the polarization alone. The variable Faraday rotator has a function of rotating around a prescribed axis as an axis of rotation on the Poincare sphere; however, arbitrary polarization conversion cannot be performed in itself. And so, quarter wavelength plates are disposed behind and ahead of each variable Faraday rotator so that the optical axes may be perpendicular mutually. As a result, a variable linear phase element is configured in which a single variable Faraday rotator makes variable a phase difference between mutually perpendicular linear polarizations. The rotation means rotating a point on the spherical surface of the Poincare sphere around a certain rotation axis and converting the point to another point on the spherical surface of the Poincare sphere.

Each of the five variable phase elements in the variable polarization controller 25 sequentially performs, on the incident light, the polarization conversion defined by a prescribed rotation axis and a rotation angle within a prescribed variable range centered at the rotation axis on the Poincare sphere. The variable polarization controller 25 includes control means for controlling each of the five variable phase elements, and the control means variably controls rotation angles of the five variable phase elements appropriately. The control means, for example, receives notice of a desired intensity of the polarization component from the feedback circuit 19, and controls the rotation angle of each variable phase element by varying a voltage applied to each variable phase element so as to maximize the intensity of the polarization component. With respect to the neighboring variable phase elements in the variable polarization controller 25, the rotation axes are mutually perpendicular when each polarization conversion function is expressed by a rotation on the Poincare sphere.

The polarization controller described in JP 3936226 B2, when the rotation angle of any one of the five variable phase elements reaches an end point of a variable range, that is, the upper limit or the lower limit, gets the variable phase element to work so that the rotation angle of such variable phase element may return to a center side of the variable range. In this case, the control means controls the polarization variation of the other variable phase element so as to compensate for the variation of the polarization conversion based on the operation of the one variable phase element. This enables the polarization controller to make the polarization state of the incident light (second optical signal) follow every variation of the polarization continuously without saturation.

As described above, the control signal generating unit 100D in accordance with the fourth exemplary embodiment includes the feedback circuit 19 and the variable polarization controller 25. The feedback circuit 19 adjusts the polarization of the second optical signal using the variable polarization controller 25 so that the optical power of the polarization of the first optical signal inputted from the light receiving element 18-1 may correspond with the optical power of the polarization of the second optical signal inputted from the light receiving element 18-2. This makes it possible to suppress the intensity variation of the wavelength-multiplexed optical signal obtained by wavelength-multiplexing the both optical signals and to suppress the deterioration of the transmission quality of the transmitting signal propagating through the transmission line 2.

Figure 12:
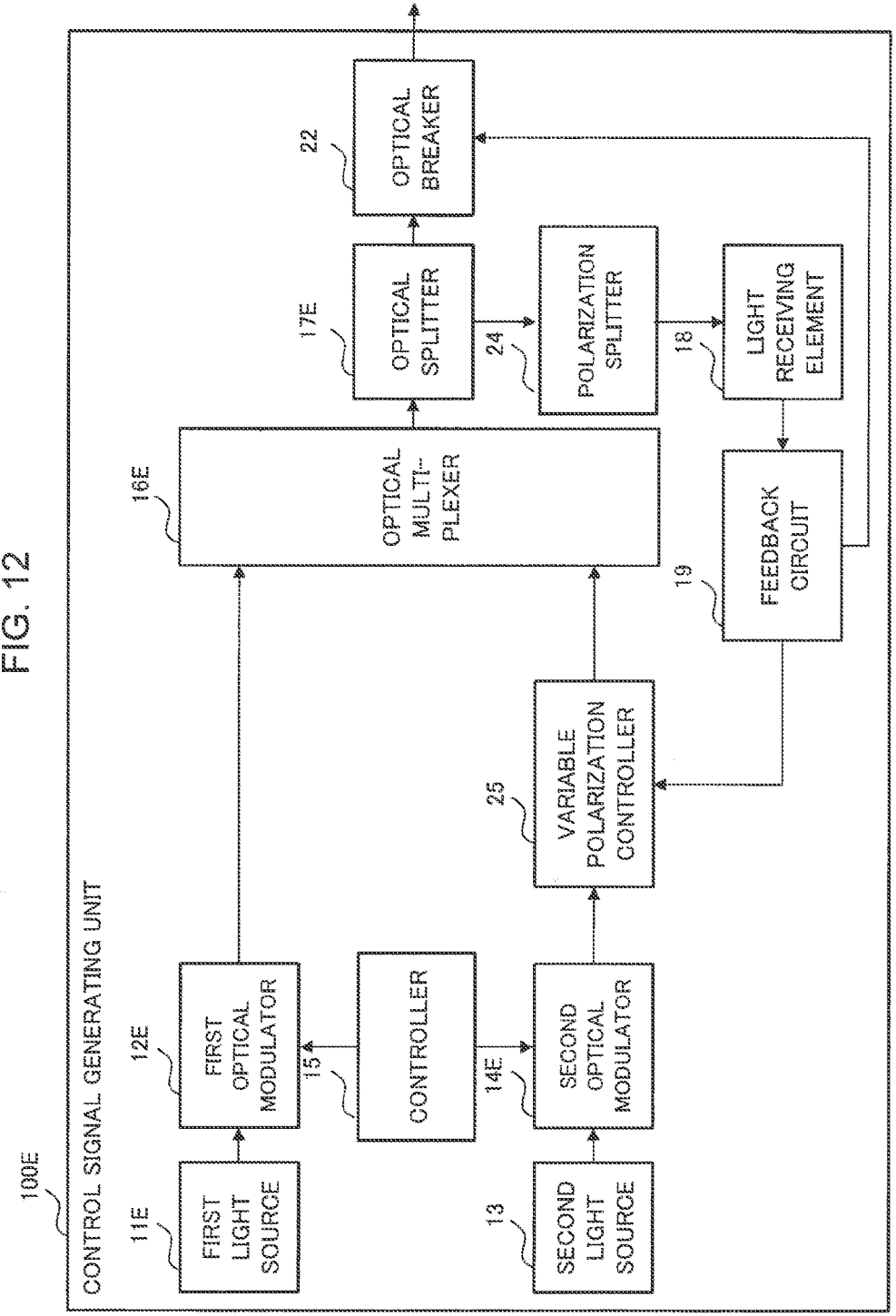
FIG. 12 is a block configuration diagram illustrating another control signal generating unit 100E in accordance with the fourth exemplary embodiment.

FIG. 12 illustrates a block configuration diagram of another control signal generating unit 100E in the fourth exemplary embodiment. In the control signal generating unit 100E illustrated in FIG. 12, a first light source 11E sends an optical signal with one of horizontal polarization and vertical polarization. In the control signal generating unit 100E illustrated in FIG. 12, a first optical modulator 12E, a second optical modulator 14E, an optical multiplexer 16E, and optical fibers connecting these components are composed of elements that are capable of holding polarization states.

Consequently, in the control signal generating unit 100E illustrated in FIG. 12, the polarization of the optical signal output from the first light source 11E remains unchanged. On the other hand, the polarization of the optical signal output from the second light source 13 is adjusted in the variable polarization controller 25 based on the control from the feedback circuit 19.

As described above, the polarization of the optical signal sent by the first light source 11E is the horizontal polarization (or vertical polarization), and the polarization of the first optical signal output from the first optical modulator 12E is the horizontal polarization (or vertical polarization).

The polarization splitter 24 outputs the polarization of the wavelength-multiplexed optical signal split by the optical splitter 17E to the light receiving element 18. If the first optical signal has the horizontal polarization, the polarization splitter 24 outputs the vertical component of the polarization of the wavelength-multiplexed optical signal to the light receiving element 18. On the other hand, if the first optical signal has the vertical polarization, the polarization splitter 24 outputs the horizontal component of the polarization of the wavelength-multiplexed optical signal to the light receiving element 18.

If the first optical signal has the horizontal polarization (or vertical polarization), the vertical component (or horizontal polarization) of the polarization of the wavelength-multiplexed optical signal should not be detected when the polarization of the first optical signal is the same as that of the second optical signal. And so, if the first optical signal has the horizontal polarization, the feedback circuit 19 compensates for the polarization of the second optical signal using the variable polarization controller 25 so that the vertical component of the polarization of the wavelength-multiplexed optical signal may become undetectable in the light receiving element 18. On the other hand, if the first optical signal has the vertical polarization, the feedback circuit 19 compensates for the polarization of the second optical signal using the variable polarization controller 25 so that the horizontal component of the polarization of the wavelength-multiplexed optical signal may become undetectable in the light receiving element 18.

The variable polarization controller 25 varies the polarization of the second optical signal on demand from the feedback circuit 19. The variable polarization controller 25 makes the both polarizations the same by fitting the polarization of the second optical signal to the polarization of the first optical signal (vertical polarization or horizontal polarization).

As described above, the control signal generating unit 100E in the fourth exemplary embodiment includes the feedback circuit 19, the polarization splitter 24, and the variable polarization controller 25. The polarization splitter 24 extracts a polarization component whose polarization state is different from that of the first optical signal, and the variable polarization controller 25 adjusts the polarization of the second signal light so that the extracted polarization component may be reduced to zero. This eliminate the shift between the polarization of the first signal light and the polarization of the second signal light; and accordingly, it is possible to suppress variations of the optical intensity of the wavelength-multiplexed optical signal obtained by wavelength-multiplexing the both light beams. Therefore, it is possible to suppress the deterioration of the transmission quality of the transmitting signal due to the intensity variation in the transmitting signal propagating through the transmission line 2.

A Fifth Exemplary Embodiment

A fifth exemplary embodiment will be described. A communication system in accordance with the fifth exemplary embodiment is configured as with the communication system in FIG. 4 described in the second exemplary embodiment. In the fifth exemplary embodiment, an optical transmission terminal equipment 6 is configured as with the optical transmission terminal equipment 6 in the first exemplary embodiment illustrated in FIG. 4.

In the fifth exemplary embodiment, a control signal receiving unit 5B in the optical branching unit 4 detects whether or not a bit error occurs in the transmission line 2, and avoids a control according to a control signal if a bit error occurs.

Figure 13:
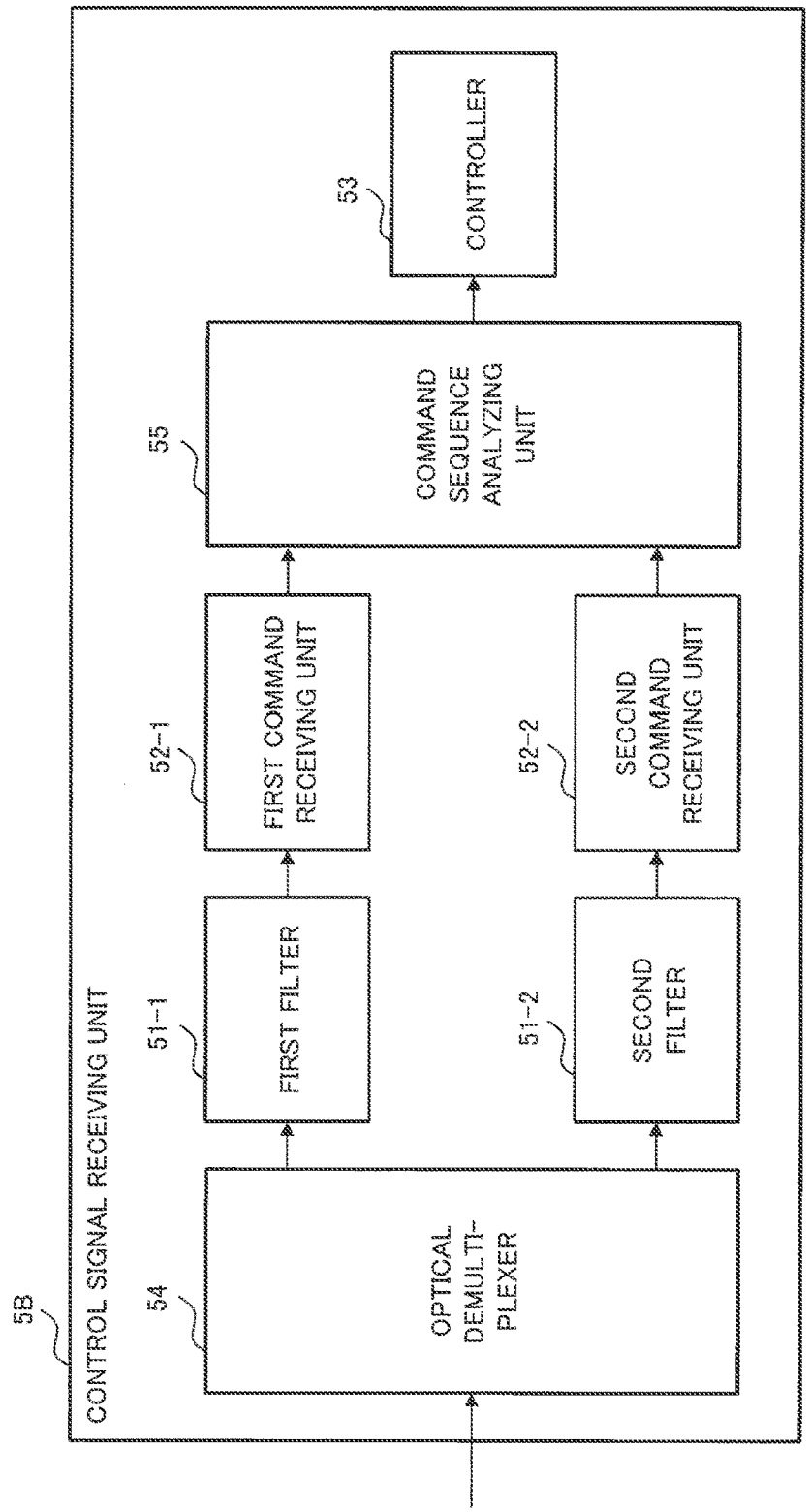
FIG. 13 is a block configuration diagram illustrating a control signal receiving unit 5B in accordance with a fifth exemplary embodiment.

FIG. 13 illustrates a block configuration diagram of the control signal receiving unit 5B included in the optical branching unit 4 in the fifth exemplary embodiment. The control signal receiving unit 5B includes a first filter 51-1, a second filter 51-2, a first command receiving unit 52-1, a second command receiving unit 52-2, an optical demultiplexer 54, a command sequence analyzing unit 55, and a controller 53.

The optical demultiplexer 54 demultiplexes a transmitting signal into a first optical signal and a second optical signal, and the transmitting signal is transmitted from the optical transmission terminal equipment 6 and received through the transmission line 2 and an optical relay 3. The optical demultiplexer 54 outputs the demultiplexed first optical signal to the first filter 51-1 and outputs the demultiplexed second optical signal to the second filter 51-2.

The first filter 51-1 transmits an optical signal having a wavelength component corresponding to a control signal from among the inputted first optical signal. That is to say, the first filter 51-1 transmits the optical signal whose wavelength is the same as that of the optical signal generated in the first light source 11 of the control signal generating unit 100 in the optical transmission terminal equipment 6.

The first command receiving unit 52-1 converts the optical signal having the wavelength component corresponding to the control signal into an electric signal, then generates a first control command by decoding, and outputs the first control command to the command sequence analyzing unit 55.

The second filter 51-2 transmits an optical signal having a wavelength component corresponding to a differential component from among the inputted second optical signal. That is to say, the second filter 51-2 transmits the optical signal whose wavelength is the same as that of the optical signal generated in the second light source 13 of the control signal generating unit 100 in the optical transmission terminal equipment 6.

The second command receiving unit 52-2 converts the optical signal having the wavelength component corresponding to the differential component into an electric signal, then generates a second control command by decoding, and outputs the second control command to the command sequence analyzing unit 55.

The command sequence analyzing unit 55 compares a bit sequence of the first control command with a bit sequence obtained by inverting the second control command, and detects a difference between them. If there is no difference between the bit sequence of the first control command and the bit sequence obtained by inverting the second control command, the command sequence analyzing unit 55 outputs the first control command to the controller 53. On the other hand, if there is a difference between the bit sequence of the first control command and the bit sequence obtained by inverting the second control command, the command sequence analyzing unit 55 does not output the first control command to the controller 53. The reason is that there is a possibility of occurrence of a bit error in the transmission line 2 if there is a difference between the bit sequence of the first control command and the bit sequence obtained by inverting the second control command, and that it is necessary to prevent an incorrect control from being executed due to a control command including the bit error.

The controller 53 controls devices in the optical branching unit 4 according to the control command inputted from the command sequence analyzing unit 55.

As described above, in the fifth exemplary embodiment, the control signal receiving unit 5B in the optical branching unit 4 detects whether or not a bit error occurs in the transmission line 2, and avoids executing a control according to the control signal if the bit error occurs. Therefore, it is possible to prevent an incorrect control from being executed in the optical branching unit 4 due to a control command including the bit error.

In the fifth exemplary embodiment, the control signal receiving unit 5B is disposed in the optical branching unit 4, but the configuration is not limited to this. For example, if the optical relay 3 is controlled by the control signal, the control signal receiving unit 5B is also disposed in the optical relay 3.

A Sixth Exemplary Embodiment

A sixth exemplary embodiment will be described. In the sixth exemplary embodiment, computers, a CPU (central processing unit), an MPU (micro-processing unit), or the like included in the optical transmission device 1, the optical relay 3, the optical branching unit 4, and/or the optical transmission terminal equipment 6 executes the software (program) putting into practice the functions of each exemplary embodiment mentioned above.

In the sixth exemplary embodiment, the optical transmission device 1, the optical relay 3, the optical branching unit 4, and/or the optical transmission terminal equipment 6 obtains the program putting into practice the functions of each exemplary embodiment mentioned above through various types of recording medium such as CD-R (compact disc recordable) or through a network. The program obtained by the optical transmission device 1, the optical relay 3, the optical branching unit 4, and/or the optical transmission terminal equipment 6, or the recording medium storing the program, composes the present invention. The program may be stored in advance in a prescribed storage unit included in the optical transmission device 1, the optical relay 3, the optical branching unit 4, and/or the optical transmission terminal equipment 6, for example.

The computer, CPU, MPU, or the like included in the optical transmission device 1, the optical relay 3, the optical branching unit 4, and/or the optical transmission terminal equipment 6 reads program codes of the obtained program, and executes the program codes. Therefore, the optical transmission device 1, the optical relay 3, the optical branching unit 4, and/or the optical transmission terminal equipment 6 executes the same processes as those of the optical transmission device 1, the optical relay 3, the optical branching unit 4, and/or the optical transmission terminal equipment 6 in each exemplary embodiment mentioned above.

A Seventh Exemplary Embodiment

Figure 14:
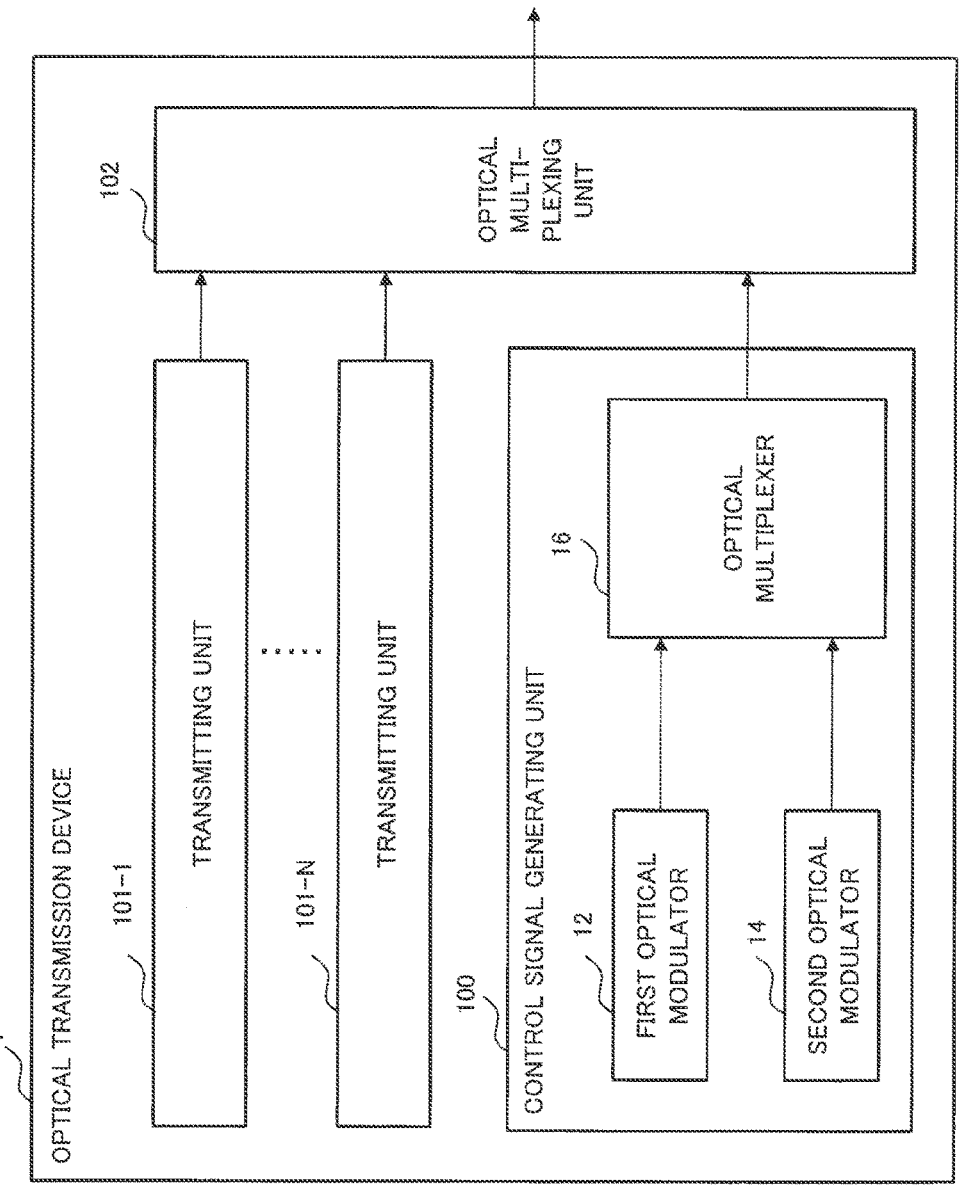
FIG. 14 is a block configuration diagram illustrating an optical transmission device 1 in accordance with a seventh exemplary embodiment.

A seventh exemplary embodiment will be described. FIG. 14 illustrates a block configuration diagram of an optical transmission device 1 in accordance with a seventh exemplary embodiment. The optical transmission device 1 in accordance with the seventh exemplary embodiment includes a control signal generating unit 100, a plurality of transmitting units 101-1 to 101-N (referred to as "transmitting unit 101" if there is no need to distinguish them particularly), and an optical multiplexing unit 102. Although a plurality of the transmitting units 101 are illustrated in FIG. 14, it is only necessary to include at least one transmitting unit 101.

The transmitting unit 101 outputs main signal light to the optical multiplexing unit 102.

The optical multiplexing unit 102 multiplexes an optical signal inputted from the transmitting unit 101 and a wavelength-multiplexed optical signal inputted from the control signal generating unit 100, and transmits a transmitting signal.

The control signal generating unit 100 includes a first optical modulator 12, a second optical modulator 14, and an optical multiplexer 16. The first optical modulator 12 intensity-modulates an optical signal depending on an inputted control signal, and outputs a first optical signal. The second optical modulator 14 intensity-modulates an optical signal depending on a differential component between a prescribed signal having a constant intensity and the control signal, and outputs a second optical signal. The optical multiplexer 16 multiplexes the output first optical signal and the output second optical signal, and outputs a wavelength-multiplexed optical signal.

Figure 15:
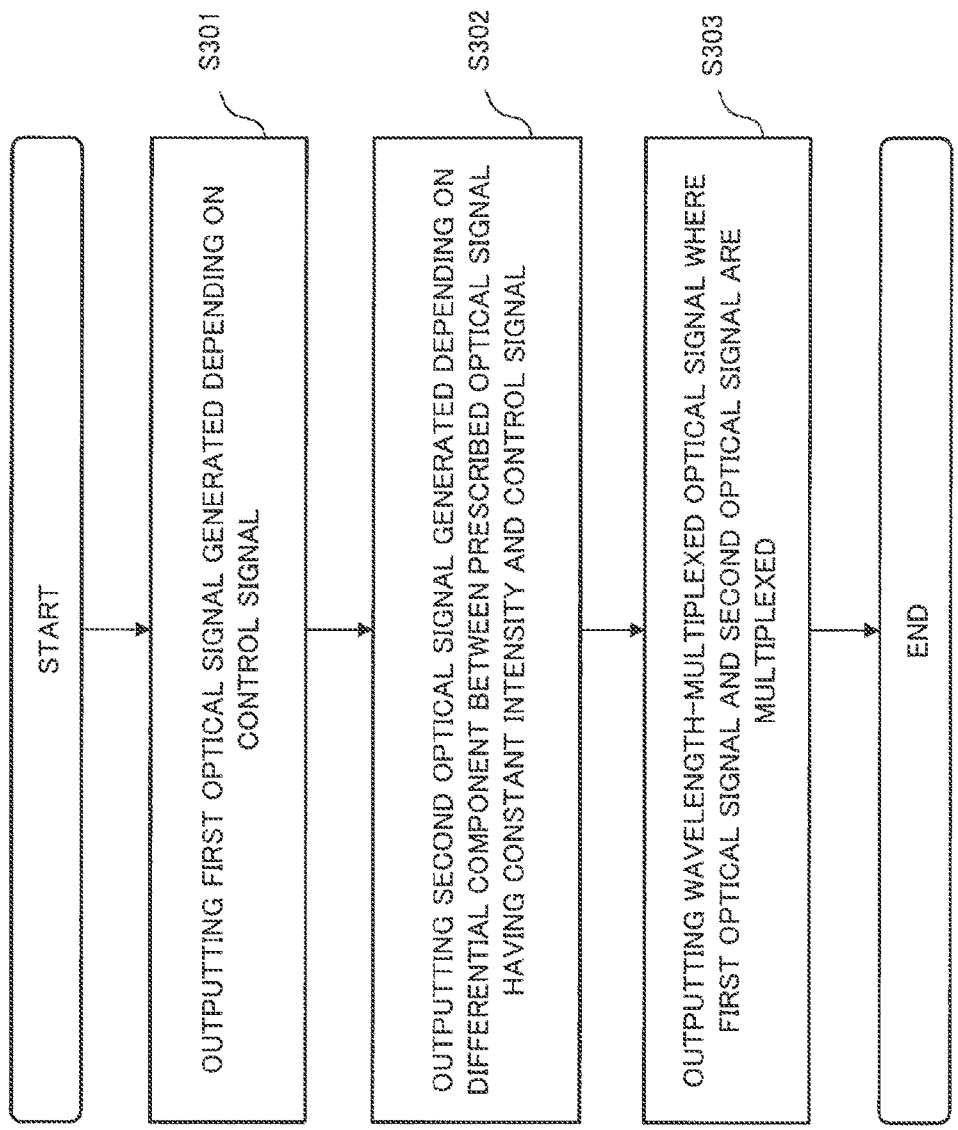
FIG. 15 is a flowchart for the optical transmission device 1 in accordance with the seventh exemplary embodiment.

FIG. 15 illustrates a flowchart for the control signal generating unit 100 in the optical transmission device 1 in accordance with the seventh exemplary embodiment. In FIG. 15, the first optical modulator 12 intensity-modulates an inputted optical signal depending on the control signal, and outputs a first optical signal (S301). The second optical modulator 14 intensity-modulates an inputted optical signal depending on a differential component between a prescribed signal having a constant intensity and the control signal, and outputs a second optical signal (S302). The optical multiplexer 16 outputs a wavelength-multiplexed optical signal obtained by multiplexing the first optical signal and the second optical signal (S303).

As described above, the control signal generating unit 100 in the seventh exemplary embodiment wavelength-multiplexes the first optical signal intensity-modulated depending on the control signal and the second optical signal intensity-modulated depending on the differential component between the prescribed optical signal having a constant intensity and the control signal, and outputs the wavelength-multiplexed optical signal. Since the wavelength-multiplexed optical signal includes the control signal and the differential component between the prescribed optical signal having a constant intensity and the control signal, these signals cancel each other even though the intensity of the control signal varies; and therefore, the light intensity of the wavelength-multiplexed optical signal becomes constant. As a result, in the seventh exemplary embodiment, the intensity variation of the control signal does not affect the transmitting signal obtained by multiplexing the main signal light and the wavelength-multiplexed optical signal, which enables to suppress it that the transmission quality of the transmitting signal deteriorates while propagating through the optical fiber.

An Eighth Exemplary Embodiment

Figure 16:
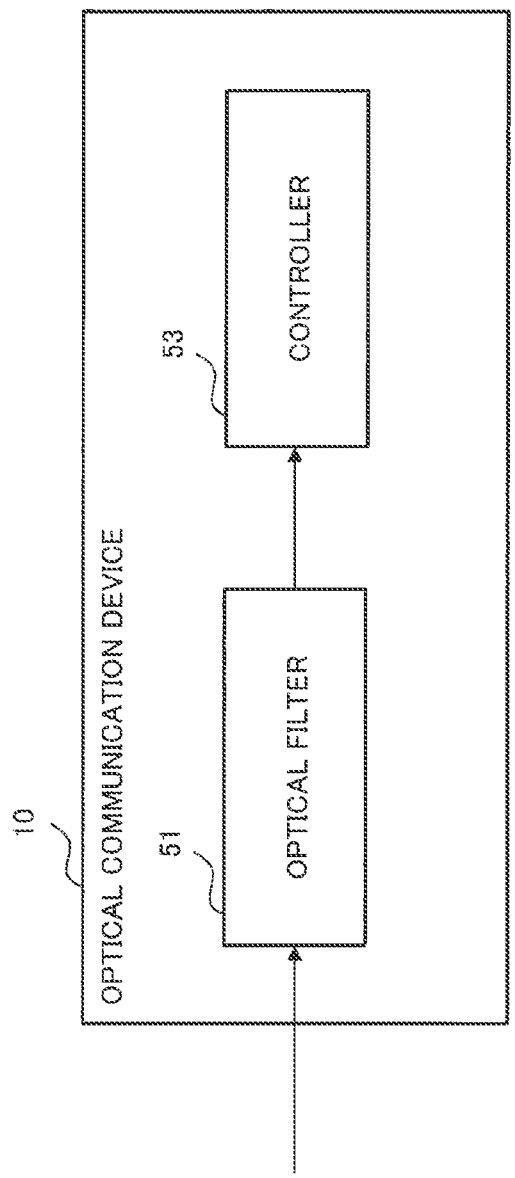
FIG. 16 is a block configuration diagram illustrating an optical communication device 10 in accordance with to an eighth exemplary embodiment.

An eighth exemplary embodiment will be described. FIG. 16 illustrates a block configuration diagram of an optical communication device 10 in accordance with the eighth exemplary embodiment. The optical communication device 10 corresponds to the optical relay 3 and/or the optical branching unit 4 in each of the above-described exemplary embodiments. The optical communication device 10 illustrated in FIG. 16 includes an optical filter 51 and a controller 53, and receives a transmitting signal in which main signal light and a wavelength-multiplexed optical signal including a control signal are multiplexed.

The optical filter 51 receives input of the transmitting signal in which the main signal light and the wavelength-multiplexed optical signal including the control signal are multiplexed. Here, the wavelength-multiplexed optical signal includes a first optical signal intensity-modulated depending on the control signal and a second optical signal intensity-modulated depending on a differential component between a prescribed optical signal having a constant intensity and the control signal. The first optical signal has a wavelength different from one of the second optical signal, and the optical filter 51 transmits an optical signal having the same wavelength as that of the first optical signal from among the inputted transmitting signal.

The controller 53 converts the optical signal that the optical filter 51 transmits into an electric signal, and then obtains the control signal by decoding.

Figure 17:
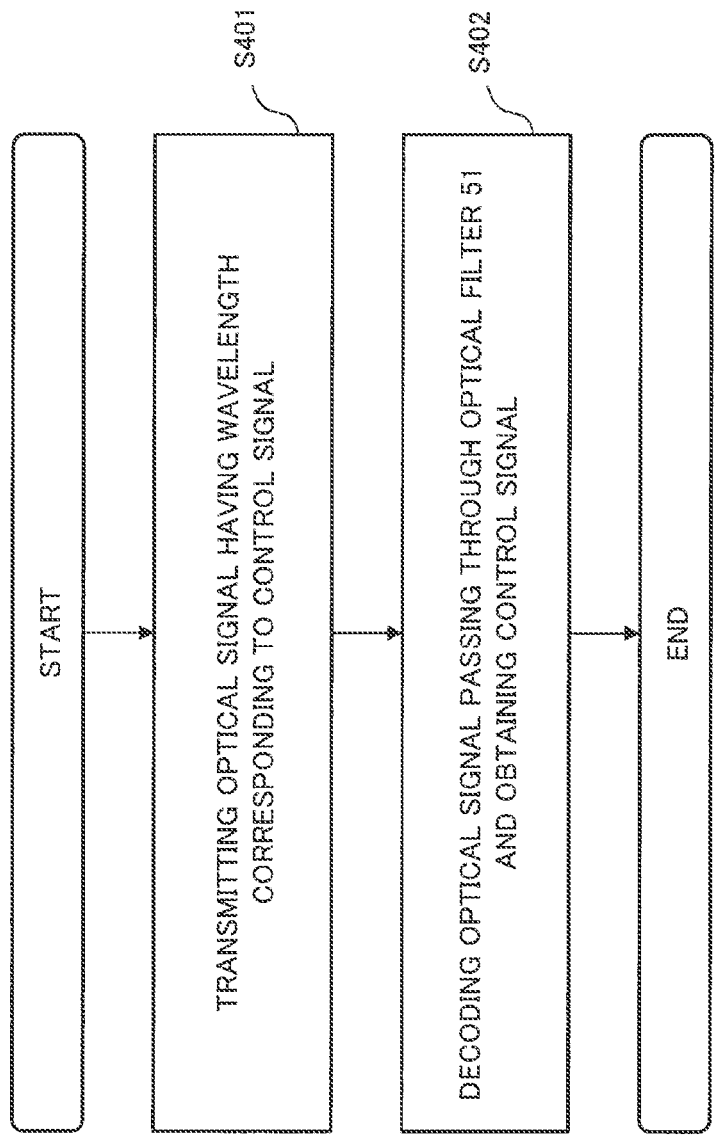
FIG. 17 is a flowchart for the optical communication device 10 in accordance with the eighth exemplary embodiment.

FIG. 17 illustrates a flowchart for the optical communication device 10 in accordance with the eighth exemplary embodiment. In FIG. 17, the optical filter 51 transmits an optical signal having a wavelength corresponding to the control signal from among the inputted transmitting signal (S401). The controller 53 converts the optical signal that the optical filter 51 transmits into an electric signal, and then obtains the control signal by decoding (S402).

As described above, the optical communication device 10 in accordance with the eighth exemplary embodiment receives the transmitting signal in which the main signal light and the wavelength-multiplexed optical signal including the control signal are multiplexed. Since the wavelength-multiplexed optical signal are composed of the control signal and the differential component between the prescribed optical signal having a constant intensity and the control signal, these signals cancel each other even though the intensity of the control signal varies; and therefore, the light intensity of the wavelength-multiplexed optical signal always becomes constant. The intensity variation of the control signal does not affect the transmitting signal obtained by multiplexing the main signal light and the wavelength-multiplexed optical signal, which enables to suppress it that the transmission quality of the transmitting signal deteriorates due to the intensity variation of the control signal.

The present invention is not limited to the aforementioned exemplary embodiments, and various modifications in design and the like without departing from the spirit of the invention are included in the scope of the present invention. The whole or part of the exemplary embodiments disclosed above can be described as, but not limited to, the following supplementary notes.

[Supplementary Note 1]

An optical transmission device, comprising: a transmitting unit for outputting main signal light; a control signal generating unit for outputting a wavelength-multiplexed optical signal including a control signal; and a first optical multiplexing unit for multiplexing the main signal light and the wavelength-multiplexed optical signal and transmitting a transmitting signal, wherein the control signal generating unit includes a first optical modulator configured to intensity-modulate an optical signal depending on the control signal, a second optical modulator configured to intensity-modulate an optical signal depending on a differential component between a prescribed signal having a constant intensity and the control signal, and a second optical multiplexing unit for outputting the wavelength-multiplexed optical signal in which the first optical signal and the second optical signal being multiplexed.

[Supplementary Note 2]

The optical transmission device according to Supplementary Note 1, further including a controller which requests the first optical modulator to perform intensity-modulating the first optical signal according to the control signal, wherein the controller calculates the differential component between the prescribed optical signal and the control signal and requests the second optical modulator to perform intensity-modulating the second optical signal according to the calculated differential component.

[Supplementary Note 3]

The optical transmission device according to Supplementary Note 1 or 2, further including a variable delay generator which changes a phase of the second optical signal based on a phase difference between the first optical signal and the second optical signal so that the phase difference is decreased.

[Supplementary Note 4]

The optical transmission device according to any one of Supplementary Notes 1 to 3, further including a variable attenuator which changes an amplitude of the second optical signal based on an amplitude difference between the first optical signal and the second optical signal so that the amplitude difference is decreased.

[Supplementary Note 5]

The optical transmission device according to any one of Supplementary Notes 1 to 4, further including a feedback circuit which detects a phase difference or an amplitude difference between the first optical signal and the second optical signal and requests to change a phase difference or amplitude of the second optical signal so that the detected phase difference or amplitude difference is decreased.

[Supplementary Note 6]

The optical transmission device according to any one of Supplementary Notes 1 to 5, further including an optical breaker which blocks transmission of the wavelength-multiplexed optical signal output from the second optical multiplexing unit according to existence of a phase difference or an amplitude difference between the first optical signal and the second optical signal.

[Supplementary Note 7]

The optical transmission device according to any one of Supplementary Notes 1 to 6, further including a variable polarization controller which changes polarization of the second optical signal so that polarization of the first optical signal and the polarization of the second optical signal are the same.

[Supplementary Note 8]

An optical communication device including:

an optical filter which allows an optical signal having a wavelength corresponding to a control signal in a wavelength-multiplexed optical signal where a main signal, a first optical signal intensity-modulated according to a control signal, and a second optical signal intensity-modulated according to a differential component between a prescribed optical signal having a constant intensity and the control signal are multiplexed to pass; and a controller which outputs the control signal decoded based on the optical signal passing the optical filter.

[Supplementary Note 9]

The optical communication device according to Supplementary Note 8, further including a command receiving unit which decodes a first bit sequence corresponding to the control signal in the optical signal passing the optical filter, wherein the controller outputs the first bit sequence notified from the command receiving unit.

[Supplementary Note 10]

The optical communication device according to Supplementary Note 9, further including an analyzing unit which compares the first bit sequence with a bit sequence obtained by inverting a second bit sequence decoded from an optical signal having a wavelength corresponding to the differential component, wherein the analyzing unit allows the controller to stop outputting the first bit sequence according to existence of a difference between the first bit sequence and the bit sequence obtained by inverting the second bit sequence.

[Supplementary Note 11]

An optical communication system including:

the optical transmission device according to any one of Supplementary Notes 1 to 7; and the optical communication device according to any one of Supplementary Notes 8 to 10 which receives the wavelength-multiplexed optical signal transmitted by the optical transmission device.

[Supplementary Note 12]

An optical transmitting method including:

a transmitting unit which outputs a main signal;

intensity-modulating a first optical signal according to a control signal;

intensity-modulating a second optical signal according to a differential component between a prescribed optical signal having a constant intensity and the control signal;

outputting a wavelength-multiplexed optical signal where the first optical signal and the second optical signal are multiplexed; and multiplexing the output main signal light and the output wavelength-multiplexed optical signal and transmitting a multiplexed optical signal.

[Supplementary Note 13]

The optical transmitting method according to Supplementary Note 12, wherein it is requested to intensity-modulate the first optical signal according to the control signal, and wherein a differential component between the prescribed optical signal and the control signal is calculated, and it is requested to intensity-modulate the second optical signal according to the calculated differential component.

[Supplementary Note 14]

The optical transmitting method according to Supplementary Note 12 or 13, wherein a phase of the second optical signal is changed based on a phase difference between the first optical signal and the second optical signal so that the phase difference is decreased.

[Supplementary Note 15]

The optical transmitting method according to any one of Supplementary Notes 12 to 14, wherein an amplitude of the second optical signal is changed based on an amplitude difference between the first optical signal and the second optical signal so that the amplitude difference is decreased.

[Supplementary Note 16]

The optical transmitting method according to any one of Supplementary Notes 12 to 15, wherein a phase difference or an amplitude difference between the first optical signal and the second optical signal is detected, and wherein it is requested to change a phase difference or amplitude of the second optical signal so that the detected phase difference or the detected amplitude difference is decreased.

[Supplementary Note 17]

The optical transmitting method according to any one of Supplementary Notes 12 to 16, wherein transmission of the output wavelength-multiplexed optical signal is blocked according to existence of a phase difference or an amplitude difference between the first optical signal and the second optical signal.

[Supplementary Note 18]

The optical transmitting method according to any one of Supplementary Notes 12 to 17, wherein polarization of the second optical signal is changed so that polarization of the first optical signal and the polarization of the second optical signal are the same.

[Supplementary Note 19]

A control method including:

allowing an optical signal having a wavelength corresponding to a control signal in a wavelength-multiplexed optical signal where a main signal, a first optical signal intensity-modulated according to a control signal, and a second optical signal intensity-modulated according to a differential component between a prescribed optical signal having a constant intensity and the control signal are multiplexed to pass; and performing control based on the passing optical signal.

[Supplementary Note 20]

The control method according to Supplementary Note 19, wherein a first bit sequence corresponding to the control signal in the optical signal passing the optical filter is decoded, and wherein the control signal decoded based on the notified first bit sequence is output.

[Supplementary Note 21]

The control method according to Supplementary Note 20, wherein the first bit sequence is compared with a bit sequence obtained by inverting a second bit sequence decoded from an optical signal having a wavelength corresponding to the differential component, and wherein notifying the first bit sequence is stopped according to existence of a difference between the first bit sequence and the bit sequence obtained by inverting the second bit sequence.

[Supplementary Note 22]

A program allowing a computer to execute processes including processes of:

outputting main signal light;

intensity-modulating a first optical signal according to a control signal;

intensity-modulating a second optical signal according to a differential component between a prescribed optical signal having a constant intensity and the control signal;

outputting a wavelength-multiplexed optical signal where the first optical signal and the second optical signal are multiplexed; and multiplexing the output main signal light and the output wavelength-multiplexed optical signal and transmitting a multiplexed optical signal.

[Supplementary Note 23]

The program according to Supplementary Note 22, further including processes of:

requesting to intensity-modulate the first optical signal according to the control signal; and calculating a differential component between the prescribed optical signal and the control signal and requesting to intensity-modulate the second optical signal according to the calculated differential component.

[Supplementary Note 24]

The program according to Supplementary Note 22 or 23, further including a process of changing a phase of the second optical signal based on a phase difference between the first optical signal and the second optical signal so that the phase difference is decreased.

[Supplementary Note 25]

The program according to any one of Supplementary Notes 22 to 24, further including a process of changing an amplitude of the second optical signal based on an amplitude difference between the first optical signal and the second optical signal so that the amplitude difference is decreased.

[Supplementary Note 26]

The program according to any one of Supplementary Notes 22 to 25, further including processes of:

detecting a phase difference or an amplitude difference between the first optical signal and the second optical signal; and requesting to change a phase difference or amplitude of the second optical signal so that the detected phase difference or the detected amplitude difference is deceased.

[Supplementary Note 27]

The program according to any one of Supplementary Notes 22 to 26, further including a process of blocking transmission of the output wavelength-multiplexed optical signal according to existence of a phase difference or an amplitude difference between the first optical signal and the second optical signal.

[Supplementary Note 28]

The program according to any one of Supplementary Notes 22 to 27, further including a process of changing polarization of the second optical signal so that polarization of the first optical signal and the polarization of the second optical signal are the same.

[Supplementary Note 29]

A program allowing a computer to execute processes including processes of:

allowing an optical signal having a wavelength corresponding to a control signal in a wavelength-multiplexed optical signal where a main signal, a first optical signal intensity-modulated according to a control signal, and a second optical signal intensity-modulated according to a differential component between a prescribed optical signal having a constant intensity and the control signal are multiplexed to pass; and outputting the control signal decoded based on the passing optical signal.

[Supplementary Note 30]

The program according to Supplementary Note 29, further including processes of:

decoding a first bit sequence corresponding to the control signal in the optical signal passing the optical filter; and performing control based on the notified first bit sequence.

[Supplementary Note 31]

The program according to Supplementary Note 30, further including processes of:

comparing the first bit sequence with a bit sequence obtained by inverting a second bit sequence decoded from an optical signal having a wavelength corresponding to the differential component, and stopping notifying the first bit sequence according to existence of a difference between the first bit sequence and the bit sequence obtained by inverting the second bit sequence.

INDUSTRIAL APPLICABILITY

The present invention can be widely applied to an optical transmission device, an optical receiving device, an optical transmitting/receiving device, or the like which transmits and receives a signal superposing a main signal on a carrier signal.

This application is based upon and claims the benefit of priority from Japanese patent application No. 2014-044937, filed on Mar. 7, 2014, the disclosure of which is incorporated herein in its entirety by reference.

REFERENCE SIGNS LIST 1 optical transmission device
2 transmission line
3 optical relay
4 optical branching unit
5 control signal receiving unit
6 optical transmission terminal equipment
11 first light source
12 first optical modulator
13 second light source
14 second optical modulator
15 controller
16 optical multiplexer
17 optical splitter
18, 18-1, 18-2 light receiving element
19 feedback circuit
20 variable attenuator
21 variable delay generator
22 optical breaker
23 optical demultiplexer
24 polarization splitter
25 variable polarization controller
51 optical filter
51-1 first filter
51-2 second filter
52 command receiving unit
52-1 first command receiving unit
52-2 second command receiving unit
53 controller
54 optical demultiplexer
55 command sequence analyzing unit

The invention claimed is:

1. An optical transmission device, comprising:
a transmitting unit configured to output main signal light;
a control signal generating unit configured to output a wavelength-multiplexed optical signal including a control signal; and
a first optical multiplexing unit configured to multiplex the main signal light and the wavelength-multiplexed optical signal and transmit a transmitting signal,
wherein the control signal generating unit comprises:
a first optical modulator configured to intensity-modulate an optical signal depending on the control signal, the first optical modulator configured to output a first optical signal,
a second optical modulator configured to intensity-modulate an optical signal depending on a differential component between a prescribed signal having a constant intensity and the control signal, the second optical modulator configured to output a second optical signal,
a second optical multiplexing unit configured to output the wavelength-multiplexed optical signal in which the first optical signal and the second optical signal being multiplexed, and
a feedback circuit configured to detect one of a phase difference and an amplitude difference between the first optical signal and the second optical signal based on the wavelength-multiplexed optical signal output from the second optical multiplexing unit, and
wherein the optical transmission device further comprises:
an optical breaking unit, and
an optical splitter configured to split, into split optical signals, the wavelength-multiplexed optical signal output from the second optical multiplexing unit and output one of the split optical signals to the feedback circuit and another of the split optical signals to an optical breaking unit,
wherein the optical breaking unit is configured to block the wavelength-multiplexed optical signal being split while one of the phase difference being detected and the amplitude difference being detected is larger than a prescribed threshold value, and to output the wavelength-multiplexed optical signal being split to the first optical multiplexing unit while smaller than the threshold value.

2. The optical transmission device according to claim 1, wherein the control signal generating unit further includes a controller configured to output the control signal being inputted to the first optical modulator and output the differential component between the prescribed signal having a constant intensity and the control signal to the second optical modulator.

3. The optical transmission device according to claim 2, further comprising
a feedback circuit configured to detect polarization of the first optical signal and polarization of the second optical signal, and
a variable polarization controller configured to vary the polarization of the second optical signal so as to make the polarization of the first optical signal identical with the polarization of the second optical signal.

4. The optical transmission device according to claim 1, further comprising a variable delay generator configured to vary a phase of the second optical signal so that the phase difference detected between the first optical signal and the second optical signal may decrease.

5. The optical transmission device according to claim 4, further comprising a variable attenuator configured to vary an amplitude of the second optical signal so that the amplitude difference detected between the first optical signal and the second optical signal may decrease.

6. The optical transmission device according to claim 4, further comprising a feedback circuit configured to detect polarization of the first optical signal and polarization of the second optical signal, and a variable polarization controller configured to vary the polarization of the second optical signal so as to make the polarization of the first optical signal identical with the polarization of the second optical signal.

7. The optical transmission device according to claim 1, further comprising a variable attenuator configured to vary an amplitude of the second optical signal so that the amplitude difference detected between the first optical signal and the second optical signal may decrease.

8. The optical transmission device according to claim 7, further comprising a feedback circuit configured to detect polarization of the first optical signal and polarization of the second optical signal, and a variable polarization controller configured to vary the polarization of the second optical signal so as to make the polarization of the first optical signal identical with the polarization of the second optical signal.

9. The optical transmission device according to claim 1, further comprising a feedback circuit configured to detect polarization of the first optical signal and polarization of the second optical signal, and a variable polarization controller configured to vary the polarization of the second optical signal so as to make the polarization of the first optical signal identical with the polarization of the second optical signal.

10. An optical communication system, comprising:

an optical transmission device configured to transmit a transmitting signal; and an optical communication device configured to receive the transmitting signal being transmitted, the optical communication device comprising:

an optical filter configured to receive a transmitting signal in which a first optical signal intensity-modulated depending on a control signal, a second optical signal intensity-modulated depending on a differential component between a prescribed optical signal having a constant intensity and the control signal, and main signal light being multiplexed, the optical filter configured to transmit an optical signal having a wavelength corresponding to the control signal from among the transmitting signal; and a controller configured to obtain the control signal by decoding the optical signal being transmitted, the controller configured to perform a control based on the control signal being obtained, wherein optical transmission device comprises:

a transmitting unit configured to output the main signal light;

a control signal generating unit configured to output a wavelength-multiplexed optical signal including the control signal, the control signal generating unit comprising:

a first optical modulator configured to intensity-modulate an optical signal depending on the control signal, the first optical modulator configured to output the first optical signal, a second optical modulator configured to intensity-modulate an optical signal depending on the differential component between the prescribed signal having the constant intensity and the control signal, the second optical modulator configured to output the second optical signal, a second optical multiplexing unit configured to output the wavelength-multiplexed optical signal in which the first optical signal and the second optical signal being multiplexed, and a feedback circuit configured to detect one of a phase difference and an amplitude difference between the first optical signal and the second optical signal based on the wavelength-multiplexed optical signal output from the second optical multiplexing unit;

a first optical multiplexing unit configured to multiplex the main signal light and the wavelength-multiplexed optical signal and transmit the transmitting signal, an optical breaking unit, and an optical splitter configured to split, into split optical signals, the wavelength-multiplexed optical signal output from the second optical multiplexing unit and output one of the split optical signals to the feedback circuit and another of the split optical signals to an optical breaking unit, wherein the optical breaking unit is configured to block the wavelength-multiplexed optical signal being split while one of the phase difference being detected and the amplitude difference being detected is larger than a prescribed threshold value, and to output the wavelength-multiplexed optical signal being split to the first optical multiplexing unit while smaller than the threshold value.

11. The optical communication system according to claim 10, wherein the wherein the control signal generating unit further includes a controller configured to output the control signal being inputted to the first optical modulator and output the differential component between the prescribed signal having a constant intensity and the control signal to the second optical modulator.

* * * * *